(12) United States Patent
Shimazaki et al.

(10) Patent No.: US 7,573,532 B2
(45) Date of Patent: Aug. 11, 2009

(54) IMAGE PROCESSING DEVICE

(75) Inventors: Hiroaki Shimazaki, Katano (JP); Kenjirou Tsuda, Hirakata (JP); Kunihiko Sakoda, Hirakata (JP)

(73) Assignee: Panasonic Corporation, Osaka (JP)

( * ) Notice: Subject to any disclaimer, the term of this patent is extended or adjusted under 35 U.S.C. 154(b) by 1258 days.

(21) Appl. No.: 10/417,123

(22) Filed: Apr. 17, 2003

(65) Prior Publication Data

US 2003/0198401 A1 Oct. 23, 2003

(30) Foreign Application Priority Data

Apr. 19, 2002 (JP) ............................. 2002-117250

(51) Int. Cl.
H04N 5/202 (2006.01)
(52) U.S. Cl. ...................... 348/674; 348/675; 348/557; 348/596
(58) Field of Classification Search ......... 348/674–675, 348/254, 557, 586, 596, 599, 659–661; 382/167, 382/162; 345/589–591, 601–602, 690
See application file for complete search history.

(56) References Cited

U.S. PATENT DOCUMENTS

| | | | |
|---|---|---|---|
| 4,727,434 A | 2/1988 | Kawamura | |
| 4,805,013 A | 2/1989 | Dei et al. | |
| 5,093,715 A * | 3/1992 | Tokuhara et al. | ............ 348/667 |
| 5,258,829 A | 11/1993 | Matsunaga et al. | |
| 5,559,903 A * | 9/1996 | Krabbenhoeft | .............. 382/283 |
| 5,987,167 A * | 11/1999 | Inoue | .......................... 382/167 |
| 6,271,891 B1 * | 8/2001 | Ogawa et al. | ............... 348/674 |
| 6,441,870 B1 * | 8/2002 | Rapaich | ..................... 348/674 |
| 6,690,487 B1 * | 2/2004 | Yamazaki | ................... 358/1.9 |
| 6,753,929 B1 * | 6/2004 | Sheraizin et al. | ............ 348/586 |
| 2003/0231193 A1 * | 12/2003 | Shimazaki et al. | .......... 345/690 |

FOREIGN PATENT DOCUMENTS

JP 06-169437 6/1994

* cited by examiner

Primary Examiner—Trang U Tran
(74) Attorney, Agent, or Firm—Wenderoth, Lind & Ponack, L.L.P.

(57) ABSTRACT

An image processing device is comprised of a parameter storing unit (i) storing a plurality of inverse gamma correction parameters, color conversion parameters, gamma correction parameters and the like, and (ii) selecting one parameter from each of a plurality of such parameters according to an inputted image signal. Further, the image processing device includes an image signal processing unit performing image signal processes such as inverse gamma correction, color conversion, gamma correction and the like, on the basis of the parameters selected by the parameter storing unit.

13 Claims, 16 Drawing Sheets

IMAGE PROCESSING DEVICE

BACKGROUND OF THE INVENTION (1) Field of the Invention

The present invention relates to an image processing device for correcting the characteristics of a display panel by performing processes for an inputted image signal so as to display the processed image signal as a visually satisfactory image in portable display apparatuses such as a notebook personal computer, a PDA and the like.

(2) Description of the Related Art

With the improvement in the performance of personal computers (to be referred to as "PC(s)" hereinafter), an increased number of image signals have been handled in recent years by PCs via digital video/versatile discs (to be referred to as "DVD(s)" hereinafter), networks and the like. Such a trend applies not only to desktop PCs but also to portable notebook PCs. Furthermore, some personal digital assistants (to be referred to as "PDA(s)" hereinafter) which are smaller in size than notebook PCs also handle image signals in these days.

However, since PCs are not originally intended for handling image signals, there is a fact that they are inferior to image display apparatuses including television, in terms of the image quality that they can offer. Images that notebook PCs can provide, in particular, lack brightness, colorfulness, and vividness due to reasons stemming from power consumption constraints including that of (i) the backlight of a liquid crystal panel which is used as a display device, not being able to be brightened much and (ii) the color filter not being able to be darkened as required because brightness needs to be ensured by saving power consumption.

Meanwhile, image display apparatuses such as the TV handle image signals in compliance with standards including NTSC. Digital image signals reproduced by a DVD and the like are also compliant with such standards as ITU-R (International Telecommunication Union, Radio Communication Sector) 656. However, while handling image signals of DVDs and others compliant with some standards or others, PCs often handle image signals such as graphic images, images acquired by a digital camera and a capture card and others which are not necessarily in conformity with standards. Accordingly, both types of image signals are directly displayed on the same liquid crystal panel, indicating that satisfactory display images are not obtained from each type of the image signals.

Under these circumstances, a satisfactory image quality for display is generally obtained by an image processing device that processes an input image signal and outputs the processed signal to a liquid crystal panel. In so doing, existing image processing devices acquire an image signal such as an RGB signal and a YIQ signal, and perform processes such as color correction and gamma correction for the image signal so as to carry out optical correction for a video camera as well as nonlinearity correction for a display device and the like.

As an example of such image processing devices, there exists an image processing device that (i) detects the amount of noise, white peak, black peak and the average brightness from an input image signal, (ii) controls a lowpass filter, a contour control circuit, a video chroma circuit, and a gamma correction circuit on the basis of the result of such detection, and (iii) performs image processing for the inputted image signal (Refer to Japanese Laid-Open Patent Application No. H6-169437 as an example).

However, these above-mentioned image processing devices require many pieces of hardware in order to calculate white peak, black peak, and the average brightness. Therefore, it is difficult for these image processing devices to be employed by portable apparatuses including notebook PCs in terms of power consumption and the scale of circuits to be mounted. Furthermore, since a uniform processing is performed for an image signal without taking into account the characteristics of a display device, there is a problem that image quality of a sufficient level cannot be obtained.

Moreover, while PCs are capable of a multi-window display of an image signal compliant with such a standard as NTSC as well as a unique image signal which does not abide by any standard, they cannot offer satisfactory display images from each of the above image signals.

The present invention has been conceived in view of the aforementioned problems, and it is an object of this invention to provide an image processing device that (i) is suited to be incorporated into a portable display device such as a notebook PC in terms of power consumption and the scale of circuits to be mounted, (ii) is capable of vividly displaying the mixture of image signals, including signals that are compliant with such a standard as NTSC and do not comply to any standards, and (iii) allows, even when more than one kind of display devices are used, such display devices to be performed of optimal brightness/color correction and enhancement as well as allowing volume production of display apparatuses which incorporate one of such display devices and an image processing device as a set.

BRIEF SUMMARY OF THE INVENTION

In order to achieve the above object, the image processing device according to the present invention is an image processing device that performs signal processing for an inputted image signal on the basis of parameters. The image processing device includes: a parameter storing unit operable to store a plurality of parameters; a parameter selecting unit operable to select one of a plurality of the parameters according to the image signal; and an image signal processing unit operable to perform the signal processing for the image signal on the basis of the parameter selected by the parameter selecting unit.

Since it is possible to perform signal processing for the image signal according to a parameter suitable for the image signal, the image signal can be displayed vividly.

Furthermore, the image processing device with the above configuration may further comprise a dividing unit operable to divide the image signal into a background screen and at least one window area, depending on where on a display screen the image signal is displayed, wherein the parameter selecting unit selects a specified parameter from among a plurality of the parameters for the background screen, and selects one parameter from among a plurality of the parameters for said at least one window area on a window area basis according to the image signal, and the image signal processing unit performs the signal processing for the background screen and said at least one window area on a window area basis, on the basis of the parameters selected by the parameter selecting unit.

Accordingly, since it is possible to perform signal processing for both the background screen and each of the window areas on the basis of parameters suitable for each image signal, the mixture of image signals on multiple windows can be vividly displayed.

Moreover, it is preferable that in the image processing device with the above configuration, the parameter selecting unit makes a judgment as to whether the image signal includes a signal that is at a signal level less than a first specified value or a signal that is at a signal level over a second specified value, and selects the parameter based on a result of the judgment.

Accordingly, it is possible to judge whether or not an image signal to be inputted is an image signal compliant with NTSC, for example, for which receiver's gamma correction is performed in advance at a video camera side.

Note that not only is it possible to embody the present invention as an image processing device with the above configuration but also as an image processing method that includes steps that are characteristic of the units of the image processing device, and as a program which has a computer execute the steps. It should be also understood that such program can be distributed via recording medium including CD-ROM and the like as well as via transmission medium including the internet and the like and excluding a recording medium.

As further information about the technical background to this application, Japanese patent application No. 2002-117250 filed Apr. 19, 2002 is incorporated herein by reference.

BRIEF DESCRIPTION OF THE DRAWINGS

These and other subjects, advantages and features of the invention will become apparent from the following description thereof taken in conjunction with the accompanying drawings that illustrate a specific embodiment of the invention. In the Drawings.

DETAILED DESCRIPTION OF THE INVENTION

The following explains the preferred embodiment of the present invention with reference to the figures.

Figure 1:
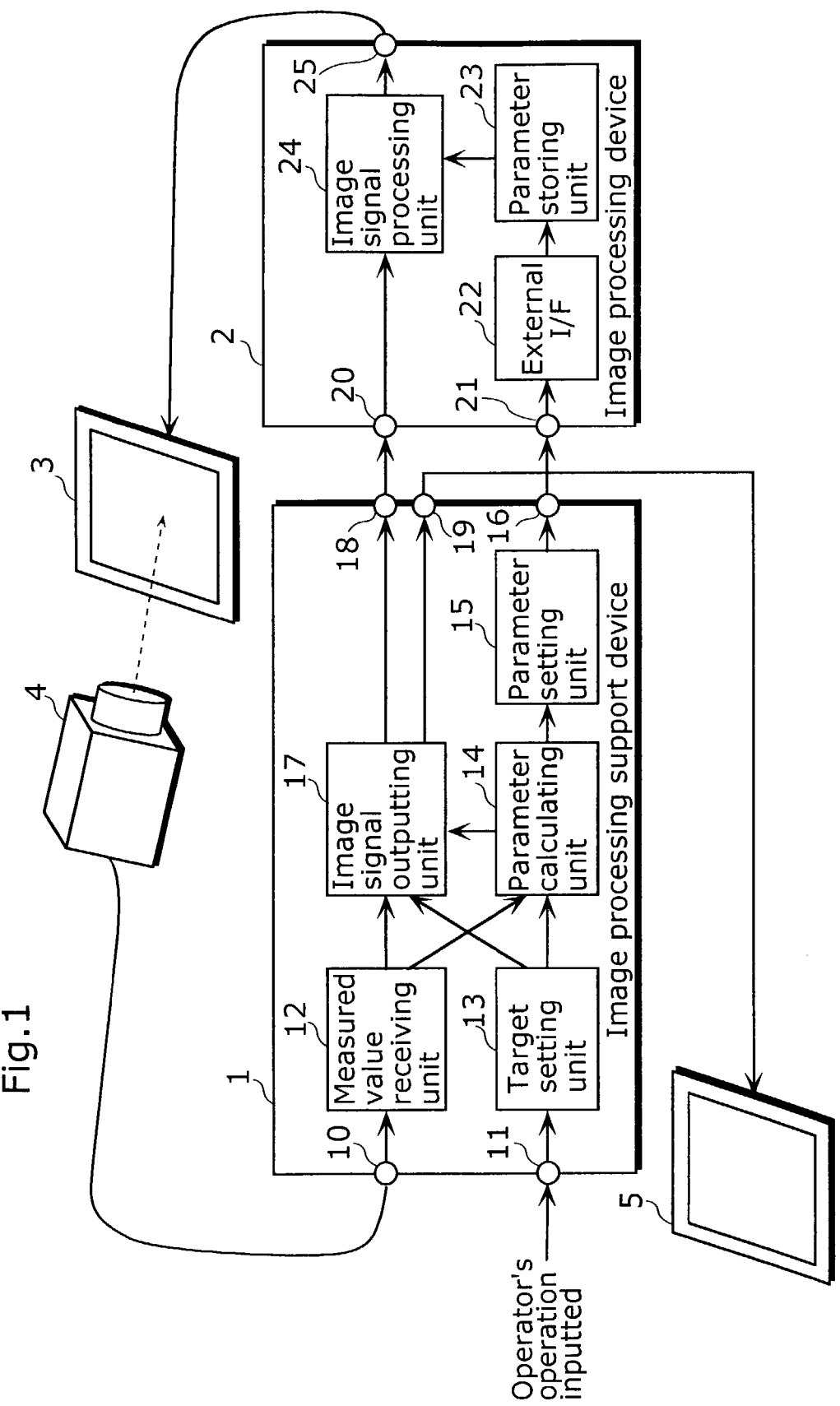
FIG. 1 is a block diagram showing a configuration of an image processing support system that employs an image processing device according to the preferred embodiment of the present invention.

FIG. 1 is a block diagram showing the configuration of an image processing support system that includes an image processing device according to the preferred embodiment of the present invention.

The image processing support system, which is a system for making adjustments to signal processing parameters used by an image processing device 2 to suit a display device 3, is comprised of an image processing support device 1, the image processing device 2, the display device 3, a measuring device 4, and an operation screen display device 5, as illustrated in FIG. 1.

The image processing support device 1 is comprised of input terminals 10 and 11, a measured value receiving unit 12, a target setting unit 13, a parameter calculating unit 14, a parameter setting unit 15, an output terminal 16, an image signal outputting unit 17, and output terminals 18 and 19.

The image signal outputting unit 17 outputs measurement image signals for measuring the gamma characteristic and color reproducibility of the display device 3. The measured value receiving unit 12 receives measurement results from the measuring device 4, via the input terminal 10, and stores the received results. The target setting unit 13 notifies the parameter calculating unit 14 and the image signal outputting unit 17 of target values which an operator has inputted via the input terminal 11. The parameter calculating unit 14 calculates parameters on the basis of the measurement results notified by the measured value receiving unit 12 and the target values notified by the target setting unit 13. The parameter setting unit 15 outputs such parameters to the image processing device 2 via the output terminal 16.

The image processing device 2 is comprised of input terminals 20 and 21, an external interface 22, a parameter storing unit 23, an image signal processing unit 24, and an output terminal 25.

The parameter storing unit 23 stores a plurality of inverse gamma correction parameters, color conversion parameters, gamma correction parameters and the like, and selects an appropriate parameter from each of a plurality of the parameters according to an image signal and others to be inputted. The image signal processing unit 24 performs image signal processes such as inverse gamma correction, color conversion and gamma correction for the inputted image signal, on the basis of the parameters selected by the parameter storing unit 23.

First, an explanation is given for the operation for measuring the gamma characteristic and color reproducibility of the display device 3 in the image processing support system with the above configuration.

The image signal outputting unit 17 of the image processing support device 1 outputs measurement image signals for measuring the gamma characteristic and color reproducibility of the display device 3. Such measurement image signals are outputted to the display device 3, via the image processing device 2, but it is necessary that processes including gamma correction and color enhancement shall not be performed by the image processing device 2 while measurement is ongoing. For this reason, the parameter calculating unit 14 of the image processing support device 1 prepares such measurement parameters as to make the image signal processing unit 24 not perform signal processes such as gamma correction and color enhancement for the input signals from the input terminal 20 so that such input signals can be delivered to the output terminal 25 as source signals. The parameter setting unit 15 outputs the measurement parameters prepared by the parameter calculating unit 14 to the image processing device 2 via the output terminal 16. These measurement parameters are inputted to and stored in the parameter storing unit 23, via the input terminal 21, and via the external interface 22. The parameter storing unit 23 provides such stored measurement parameters to the image signal processing unit 24.

The measuring device 4 measures the brightness and color of the measurement image signals displayed on the display device 3, and outputs the measurement results to the image processing support device 1. The measured value receiving unit 12 receives and stores the measurement results inputted to the input terminal 10 of the image processing support device 1.

As measurement image signals outputted by the image signal outputting unit 17, a plurality of image signals, such as ones for monochrome display (e.g., whole red, green or blue) and ones for monochrome display of a plurality of gray levels, are switched and used. In order to synchronize the switching of measurement image signals with the measuring operation of the measuring device 4, the measured value receiving unit 12, upon the receipt of the measurement results from the measuring device 4, outputs, to the image signal outputting unit 17, a reception notification signal indicating that the measurement results have been received. The is image signal outputting unit 17 makes a switch of measurement image signals after receiving such a reception notification signal.

By repeating the aforementioned operation, characteristic data such as the gamma characteristic, color reproducibility and the like of the display device 3 is stored in the measured value receiving unit 12.

Figure 2:
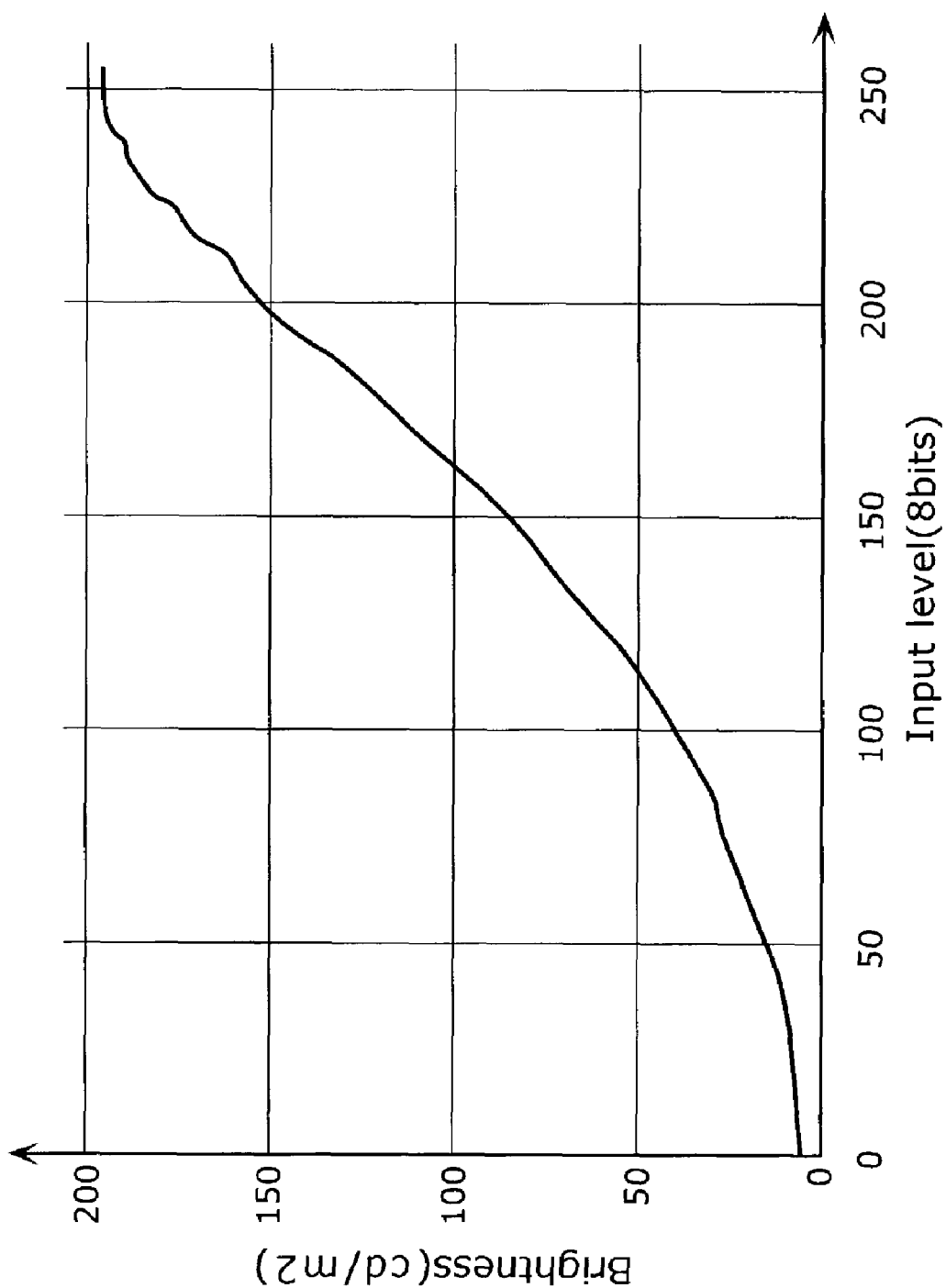
FIG. 2 is a diagram showing an example result of measuring the gamma characteristic of a display device.
Figure 3:
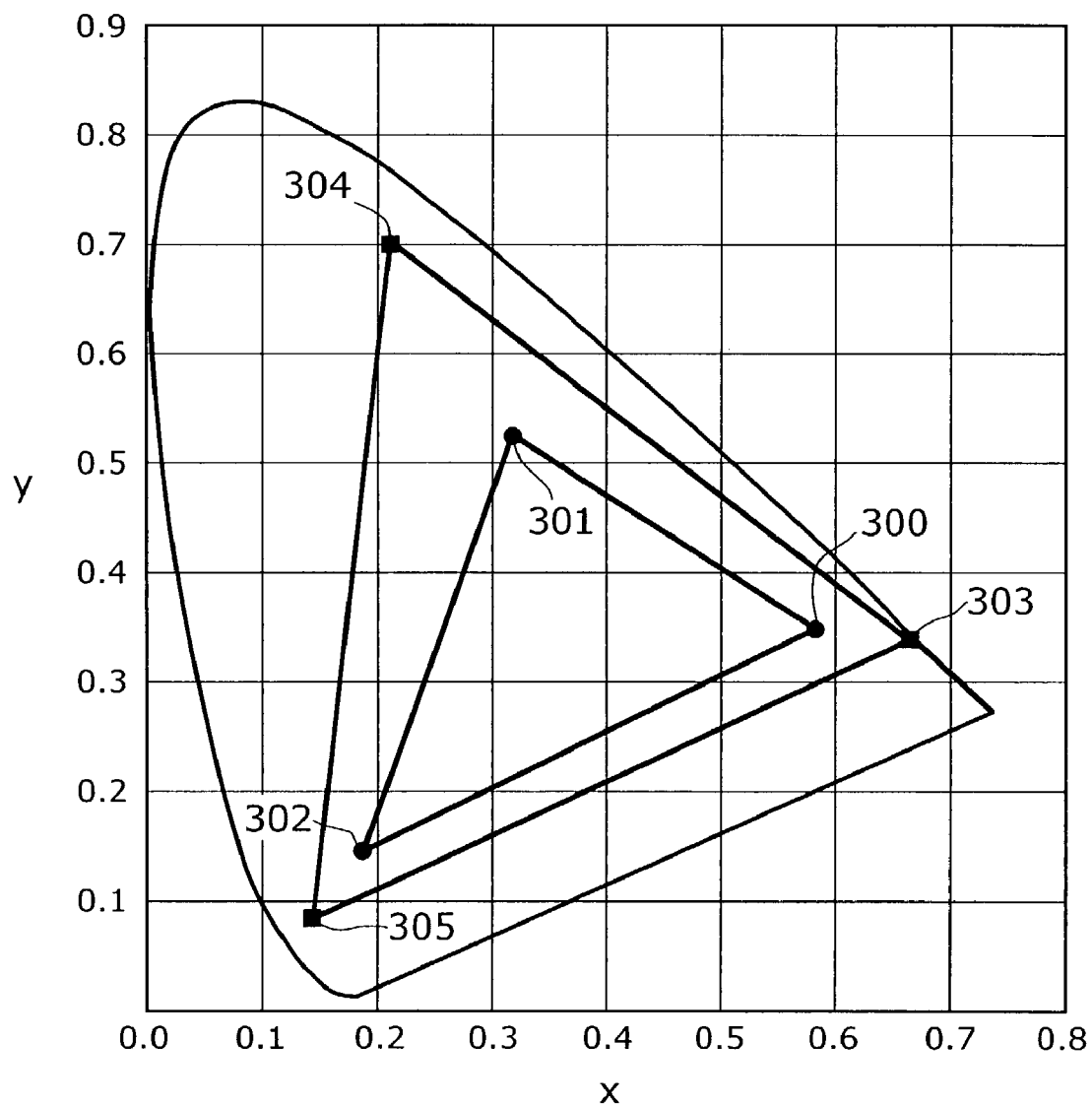
FIG. 3 is a diagram showing an example result of measuring the color reproducibility of the display device.

FIG. 2 is a diagram showing an example result of measuring the gamma characteristic of the display device 3, while FIG. 3 is an example result of measuring the color reproducibility of the display device 3. In the present embodiment, the display device 3 receives and displays 8-bit parallel RGB digital signals.

The gamma characteristic of the display device 3, as illustrated in FIG. 2, can be obtained by changing values between achromatic, i.e., monochrome signals (which display on the entire screen a single value as three signals of RGB) of black (R=0, G=0, B=0) and white (R=255, G=255, B=255) as measurement image signals so as to display and make a measurement. The gamma characteristic of a general display device shows a nonlinear characteristic as illustrated in FIG. 2.

Meanwhile, chromaticity indicated by a point R300 shown in FIG. 3 can be obtained by displaying and measuring a signal showing red on the entire screen (R=255, G=0, B=0) as a measurement image signal. Similarly, chromaticity indicated by a point G301 in FIG. 3 is obtained by a signal showing green on the entire screen (R=0, G=255, B=0), and chromaticity indicated by a point B302 in FIG. 3 is obtained by a signal showing blue on the entire screen (R=0, G=0, B=255). Assuming that the display device 3 is a liquid crystal panel and the like used for such a portable display apparatus as a notebook PC, a triangle-shaped area, i.e., color reproducibility, formed by connecting RGB points, is generally smaller than the reproducibility represented by a triangle formed by connecting the point R303, the point G304, and the point B305 in the scope of the NTSC standard. For this reason, when displaying an image signal in conformity with the NTSC standard, for example, a light-colored image is displayed.

Next, a detailed explanation is given for the processing to be performed by the image processing device 2.

Figure 4:
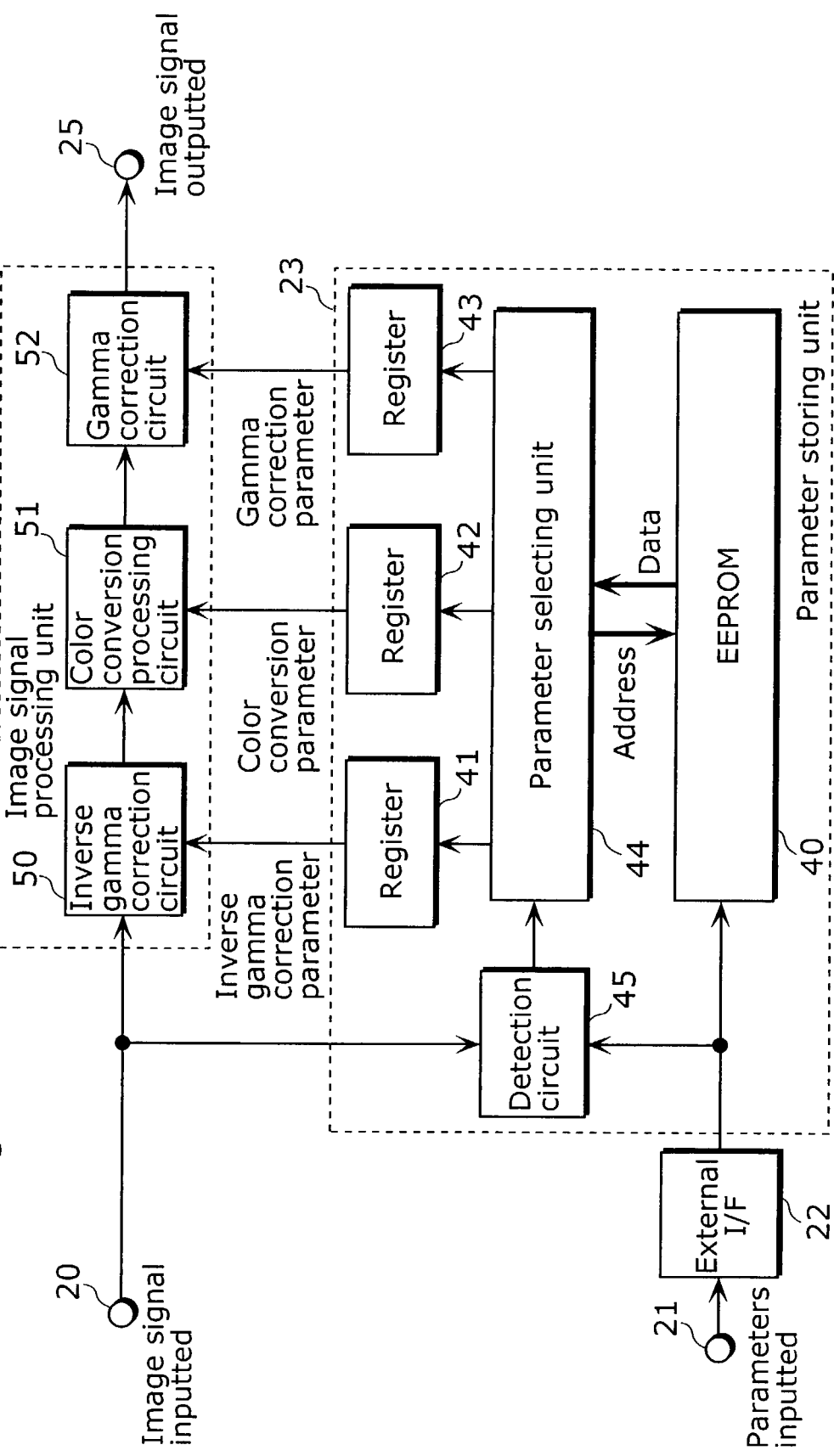
FIG. 4 is a block diagram showing an internal configuration of the image processing device according to the preferred embodiment of the present invention.

FIG. 4 is a block diagram showing the internal configuration of the image processing device 2 according to the preferred embodiment of the present invention. Note that the same numbers are assigned to the same components as those illustrated in FIG. 1.

The parameter storing unit 23 of the image processing device 2 includes an EEPROM 40, registers 41, 42 and 43, a parameter selecting unit 44, and a detection circuit 45. The image signal processing unit 24 includes an inverse gamma correction circuit 50, a color conversion processing circuit 51, and a gamma correction circuit 52.

An explanation is given here by defining the following three parameters as one set of processing parameter handled by the image processing support device 1 and the image processing device 2: inverse gamma correction parameter, color conversion parameter, and gamma correction parameter. The processing parameter inputted from the image processing support device 1 is written to the EEPROM 40 via the external interface 22. The use of EEPROM (Electrically-Erasable and Programmable ROM) for storing the processing parameter in the image processing device 2 makes it possible for the image processing device 2 to perform image processing in accordance with the once-stored processing parameter, without requiring the input of such processing parameter from the image processing support device 1.

In the present embodiment, a plurality of processing parameters are written to the EEPROM 40. One processing parameter is selected from among a plurality of the processing parameters written to the EEPROM 40 and read out by the parameter selecting unit 44, of which the inverse gamma correction parameter is outputted to the register 41, the color conversion parameter is outputted to the register 42, and the gamma correction parameter is outputted to the register 43. This parameter selection can be easily carried out by the EEPROM 40 storing processing parameters to various addresses and by the detection circuit 45 controlling the parameter selecting unit 44 according to a judgment result so as to appropriately select an address in the EEPROM 40 from which a processing parameter is read out. A judgment on the selection of one processing parameter from among a plurality of the processing parameters is made by the detection circuit 45, but a description about its method is provided later.

The inverse gamma correction parameter, which has been read out by the register 41, is outputted to the inverse gamma correction circuit 50. Then, on the basis of the inputted inverse gamma correction parameter, the inverse gamma correction circuit 50 performs an inverse gamma correction process for an image signal inputted from the input terminal 20, and outputs the processed image signal to the color conversion processing circuit 51. The color conversion parameter read out by the register 42 is outputted to the color conversion processing circuit 51, which then performs a color conversion process for the image signal inputted from the inverse gamma correction circuit 50, on the basis of the inputted color conversion parameter, and outputs the processed image signal to the gamma correction circuit 52. The gamma correction parameter read out by the register 43 is outputted to the gamma correction circuit 52, which then performs a gamma correction process for the image signal inputted from the color conversion processing circuit 51, on the basis of the inputted gamma correction parameter, and outputs the processed image signal to the output terminal 25.

Figure 5:
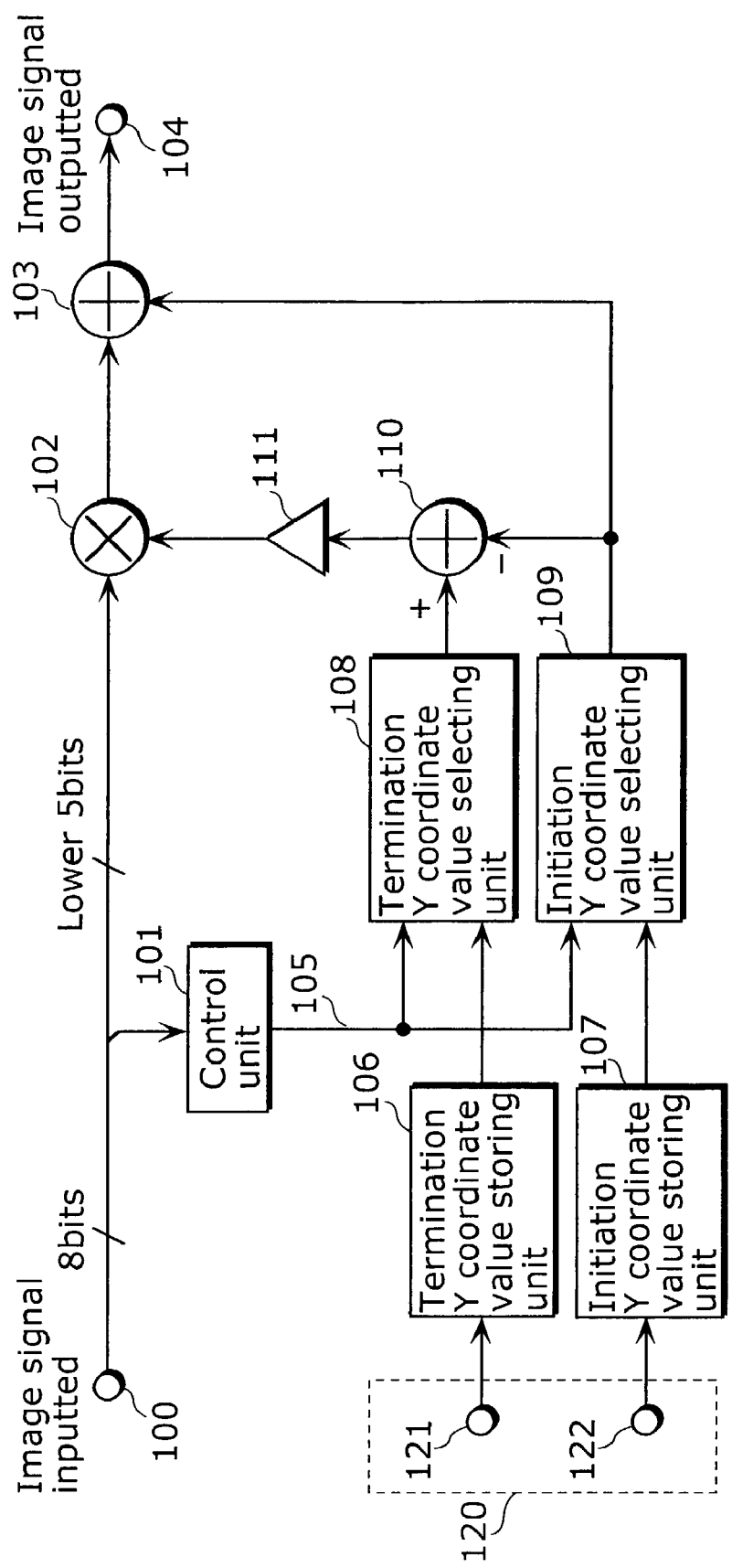
FIG. 5 is a block diagram showing a configuration of an inverse gamma correction circuit.

FIG. 5 is a block diagram showing the configuration of the inverse gamma correction circuit 50.

The inverse gamma correction circuit 50 has an input terminal 100, a control unit 101, a multiplier 102, an adder 103, an output terminal 104, a termination Y coordinate value storing unit 106, an initiation Y coordinate value storing unit 107, a termination Y coordinate value selecting unit 108, an initiation Y coordinate value selecting unit 109, a subtracter 110, a divider 111, a parameter input terminal 120, and input terminals 121 and 122. Note that FIG. 5 is a block diagram showing a circuit in the inverse gamma correction circuit 50 that processes only one signal out of RGB signals, and therefore the inverse gamma correction circuit 50 has three circuits for all RGB signals in parallel which are equivalent to the circuit shown in FIG. 5.

In this inverse gamma correction circuit 50, the characteristic of inverse gamma correction is more closely analogous to a broken line divided into eight parts. In other words, an inputted image signal is judged as to which part belongs to the eight parts according to the level of such image signal, and processed to be converted into an output value through linear approximate calculation in a part determined in accordance with the result of such judgment.

Figure 6:
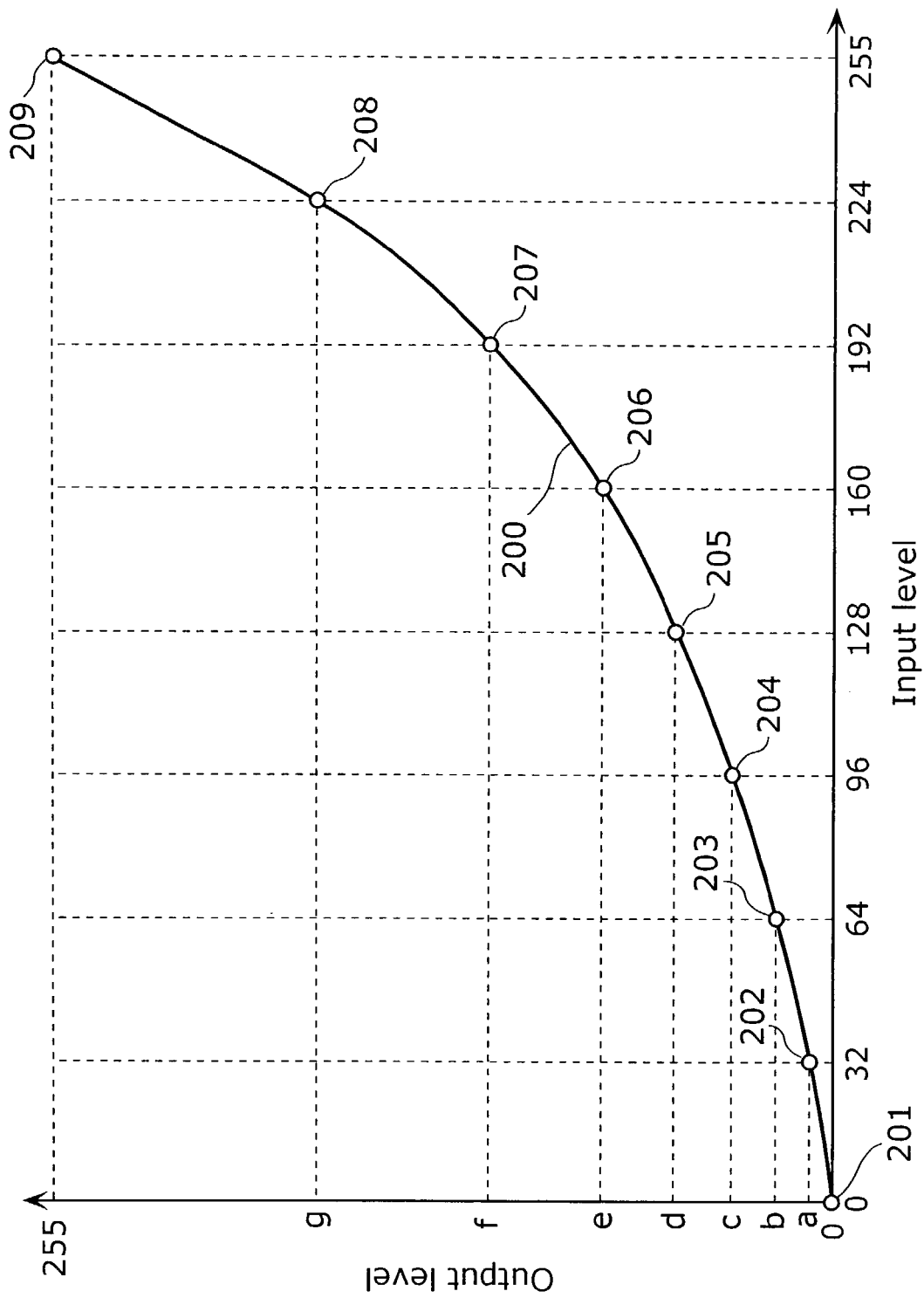
FIG. 6 is a diagram explaining the contents of a correction process in the inverse gamma correction circuit.

FIG. 6 is a diagram explaining the contents of the correction process performed by the inverse gamma correction circuit 50 illustrated in the block diagram of FIG. 5. The horizontal axis indicates the level of an image signal inputted from the input terminal 100, while the vertical axis indicates the level of the image signal outputted from the output terminal 104. Depending on which of the eight parts resulted from dividing the input level for every 32 values (indicated by eight lines: 201-202, 202-203, 203-204, 204-205, 205-206, 206-207, 207-208, and 208-209) such inputted image signal belongs to, an approximation process is performed for the corresponding part. Y axis values corresponding to the both edges of each of the eight parts (i.e., 0, a, b, c, d, e, f, g, and 255) are an inverse gamma correction parameter in the present embodiment.

Initiation Y coordinate values of the eight lines, i.e., output level values (0, a, b, c, d, e, f, and g) indicated by break points on the left of each line in FIG. 6 are stored as initiation Y coordinate values by the initiation Y coordinate value storing unit 107 via the input terminal 122. Furthermore, termination Y coordinate values of the eight lines, i.e., output level values (a, b, c, d, e, f, g, and 255) indicated by break points on the right of each line in FIG. 6 are stored as termination Y coordinate values by the termination Y coordinate value storing unit 106 via the input terminal 121.

The 8-bit parallel image signal inputted from the input terminal 100 is divided into the upper 3 bits and the lower 5 bits, and the upper 3 bits are inputted to the control unit 101 and the lower 5 bits are inputted to the multiplier 102, respectively. Using these 3 bit values, the control unit 101 judges which part on the broken line in FIG. 6 the inputted image signal belongs to, and controls the termination Y coordinate value selecting unit 108 and the initiation Y coordinate value selecting unit 109 by the use of a judgment result signal 105 in accordance with the result of such judgment. Under the control of the control unit 101, the termination Y coordinate value selecting unit 108 and the initiation Y coordinate value selecting unit 109 respectively output Y coordinate values indicating the both ends of the part which the input image signal belong to, out of the Y coordinate values corresponding to the broken lines stored in the termination Y coordinate value storing unit 106 and the initiation Y coordinate value storing unit 107.

A value indicating the slope of the broken line corresponding to the part which the input image signal belongs to is determined by subtracting, via the subtracter 110, the value outputted from the initiation Y coordinate value selecting unit 109 from the value outputted from the termination Y coordinate value selecting unit 108, and further by dividing the resulting value by the fixed value 32 by the divider 111. Such resulting slope value outputted from the divider 111 is outputted to the multiplier 102. The multiplier 102 outputs to the adder 103 a value to be determined by multiplying the slope value from the divider 111 by the lower 5 bits of the input image signal from the input terminal 100, i.e., an offset value on the Y axis derived from the initiation Y coordinate value on the broken line corresponding to the input image signal. The adder 103 adds the inputted offset value with the initiation Y coordinate value on the broken line corresponding to the input image signal inputted from the initiation Y coordinate value selecting unit 109 so as to determine a value of the output level, and outputs the result to the output terminal 104.

Figure 7:
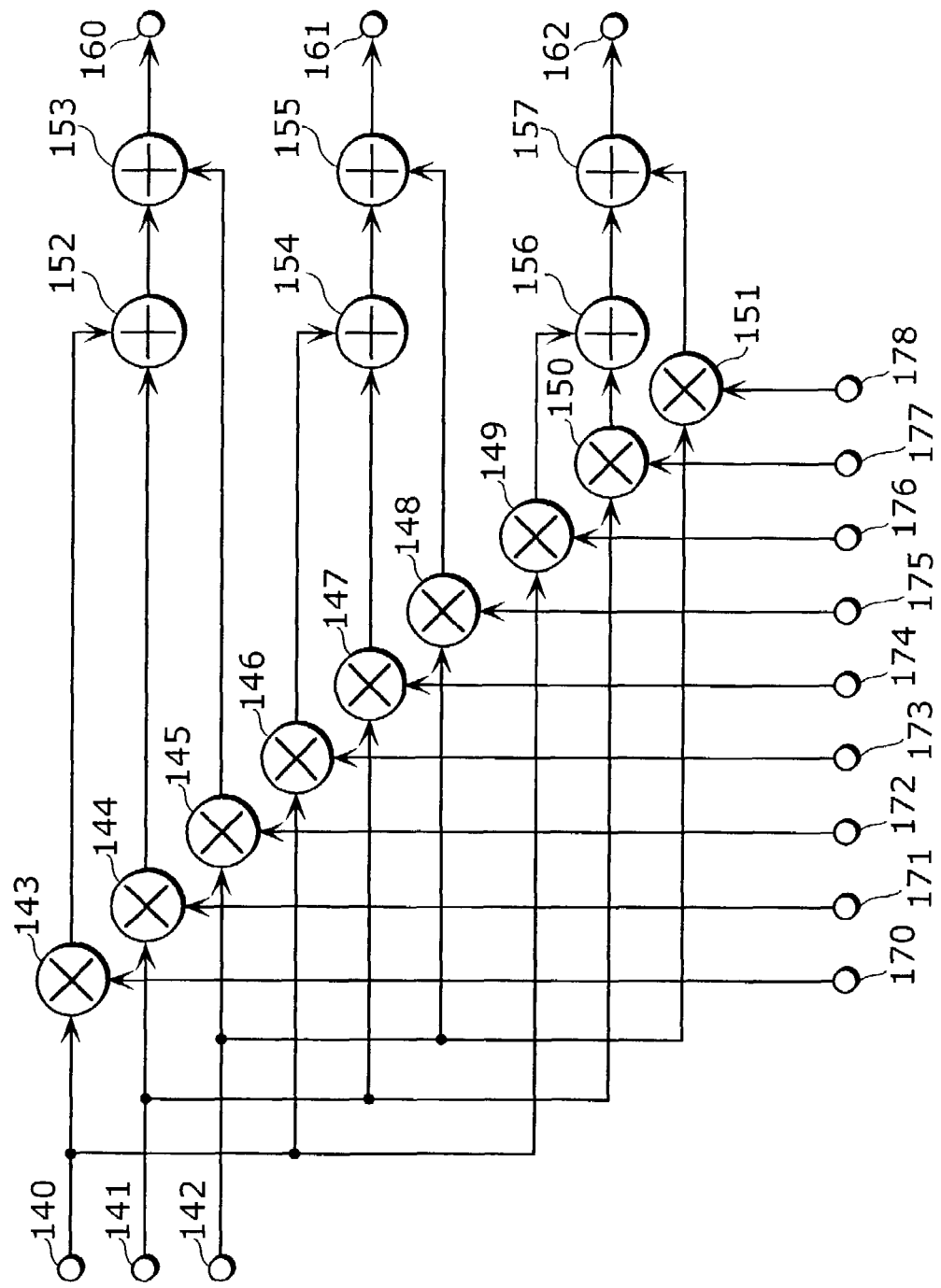
FIG. 7 is a block diagram showing a configuration of a color conversion processing circuit.

FIG. 7 is a block diagram showing the configuration of the color conversion processing circuit 51.

The color conversion processing circuit 51 has input terminals 140, 141, and 142, multipliers 143, 144, 145, 146, 147, 148, 149, 150 and 151, adders 152, 153, 154, 155, 156 and 157, output terminals 160, 161, and 162, and input terminals 170, 171, 172, 173, 174, 175, 176, 177, and 178. Note that FIG. 7 is a diagram depicting all signals of RGB.

The color conversion processing circuit 51 performs a color conversion process for inputted RGB image signals through 3×3 matrix calculation. Assuming that the input RGB signals are respectively R, G, and B, output signals are respectively R', G', and B', and a color conversion parameter consists of A11, A12, A13, A21, A22, A23, A31, A32, and A33, a calculation to be performed in the color conversion processing circuit 51 illustrated in FIG. 7 is represented by the following Expression (1):

$$\begin{pmatrix} R' \\ G' \\ B' \end{pmatrix} = \begin{pmatrix} A11 & A12 & A13 \\ A21 & A22 & A23 \\ A31 & A32 & A33 \end{pmatrix} \begin{pmatrix} R \\ G \\ B \end{pmatrix} \quad (1)$$

Therefore, when the R signal is inputted to the input terminal 140, the G signal to the input terminal 141, and the B signal to the input terminal 142 respectively, the parameter A11 is inputted to the input terminal 170, the parameter A12 to the input terminal 171, the parameter A13 to the input terminal 172, the parameter A21 to the input terminal 173, the parameter A22 to the input terminal 174, the parameter A23 to the input terminal 175, the parameter A31 to the input terminal 176, the parameter A32 to the input terminal 177, and the parameter A33 to the input terminal 178, respectively. As a result of performing calculations for these parameters, the R' signal is outputted to the output terminal 160, the G' signal to the output terminal 161, and the B' signal to the output terminal 162 respectively.

Note that the gamma correction circuit 52 can be embodied by a circuit with the configuration equivalent to that of the inverse gamma correction circuit 50 illustrated in FIG. 5.

Next, an explanation is given for the operation for calculating an inverse gamma correction parameter in the image processing support device 1 illustrated in FIG. 1.

Figure 8:
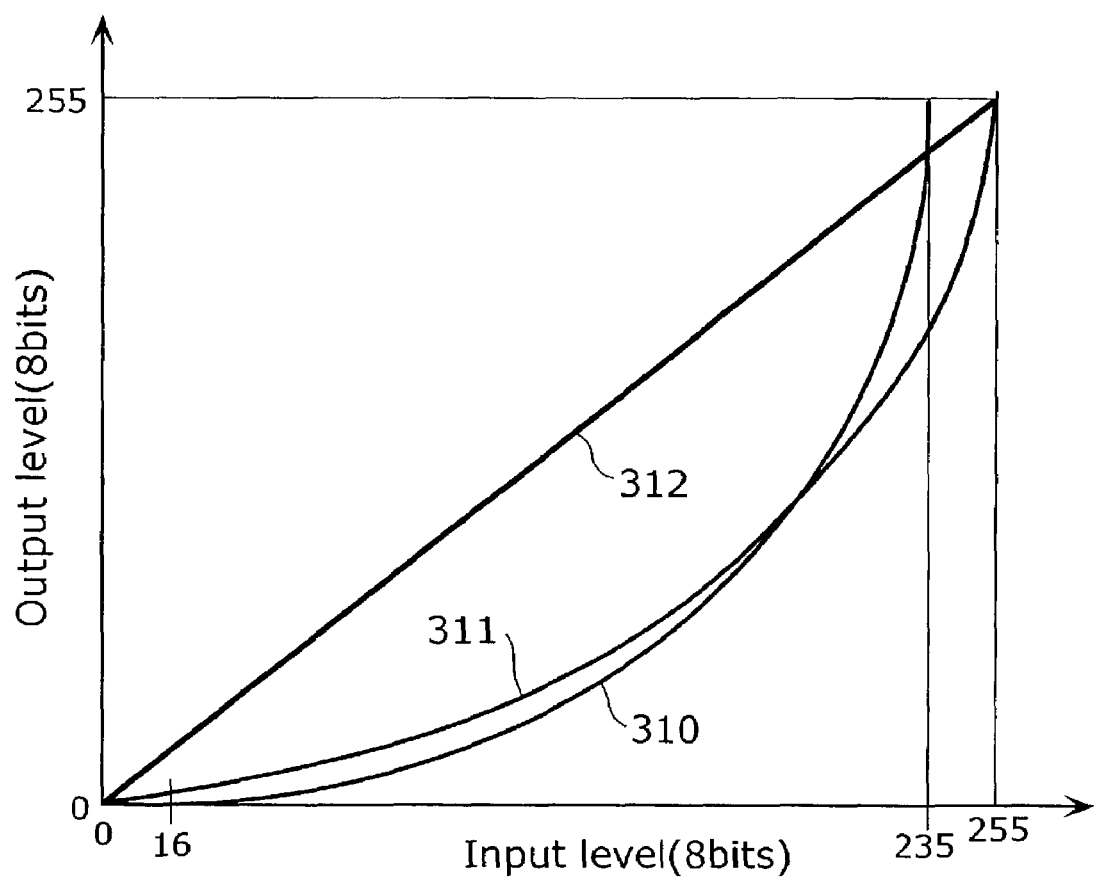
FIG. 8 is a diagram showing an example processing characteristic specified by an inverse gamma correction parameter.

FIG. 8 is a diagram showing an example processing characteristic specified by the inverse gamma correction parameter. Assuming that an image signal to be inputted is an image signal such as an NTSC-compliant image signal for which receiver's gamma correction is performed in advance at the video camera side, it is necessary for the inverse gamma correction circuit 50 to calculate the inverse characteristic of such receiver's gamma correction characteristic in order to obtain a linear signal. Accordingly, the parameter calculating unit 14 calculates an inverse gamma correction parameter which has the inverse gamma characteristic represented by a curve 310 illustrated in FIG. 8.

Regarding the calculation performed by the parameter calculating unit 14, since the characteristics of the display device do not have a direct influence on the inverse gamma correction characteristic, all that is required is to calculate the inverse characteristic of the NTSC-compliant receiver's gamma correction characteristic as an inverse gamma correction parameter, and the result of the calculation is just required to be stored as a fixed value. For example, letting an input signal and an output signal of the inverse gamma correction circuit 50 be Xg and Yg, respectively, the curve 310 in FIG. 8 can be determined using the following Expression (2):

When Xg<16, $$Yg=0$$

When $16 \leq Xg \leq 235$, $$Yg=255 \times ((Xg-16)/(235-16))^{**}(1/2.2)$$

When 235<Xg, $$Yg=255 \quad (2)$$

Note that "**" indicates an exponential calculation in this specification.

In other words, the parameter calculating unit 14 determines, by the use of the above Expression (2), an inverse gamma correction parameter which indicates Y axis values corresponding to the both ends of the eight parts resulted from dividing the input level for every 32 levels as explained above.

The parameter calculating unit 14 can be easily embodied by employing a microcomputer as hardware, for example, and implementing Expression (2) on software to be executed on such microcomputer. Further, since the value of Xg is fixed in the inverse gamma correction circuit 50 illustrated in FIG. 5, it is also possible that the parameter calculating unit 14 stores a value for Yg that corresponds to the value of Xg to be determined through Expression (2).

Meanwhile, some graphic images generated by software and images taken by a digital camera are not compliant with the NTSC standard and utilize 8-bit parallel full scale as all image data. A curve 311 illustrated in FIG. 8 is an example inverse gamma characteristic in that case. Here, the parameter calculating unit 14 calculates and outputs an inverse gamma correction parameter which has the inverse gamma characteristic represented by the curve 311. This curve 311 is determined using the following Expression (3):

$$Yg=255 \times (Xg/255)^{**}(1/2.2) \quad (3)$$

In other words, the parameter calculating unit 14 calculates an inverse gamma correction parameter using the above Expression (3).

Note that when an image signal does not conform to NTSC, there is a case where a value other than 2.2 is a gamma coefficient and where the image signal is given not a display gamma characteristic but a linear characteristic as represented by a line 312 illustrated in FIG. 8.

The inverse gamma correction parameter calculated by the parameter calculating unit 14 of the image processing support device 1 is outputted to the image processing device 2 by the parameter setting unit 15.

Next, an explanation is given for the operation for switching inverse gamma correction parameters to be carried out by the image processing device 2 in which a plurality of inverse gamma correction parameters are set. For simplification purposes, assume that only the gamma characteristic for which a calculation shall be performed by using Expression (3) is given when an image signal is non-NTSC compliant, and that the image processing device 2 has the following two inverse gamma correction parameters: the inverse gamma correction parameter determined by the use of Expression (3); and the inverse gamma correction parameter determined by the use of the Expression (2) which is intended for an NTSC-compliant image signal.

The detection circuit 45 illustrated in FIG. 4 detects, from the image signal inputted via the input terminal 20, the presence/absence of image data whose input level is less than 16 or the presence/absence of image data whose input level is over 235. If image data whose input level is less than 16 or over 235 is inputted, the detection circuit 45 controls the parameter selecting unit 44 to make it use the inverse gamma correction parameter determined by the use of the Expression (3), and use the inverse gamma correction parameter determined by the use of the Expression (2) in other cases.

By performing the aforementioned operation, it is possible for the inverse gamma correction circuit 50 to conduct inverse gamma correction for providing an optimal characteristic depending on whether or not an image signal inputted, via the input terminal 20, is compliant with NTSC, and consequently to obtain a satisfactory processed image for each type of image signal.

Next, an explanation is given for the operation for calculating a color conversion parameter in the image processing support device 1 illustrated in FIG. 1.

Figure 9:
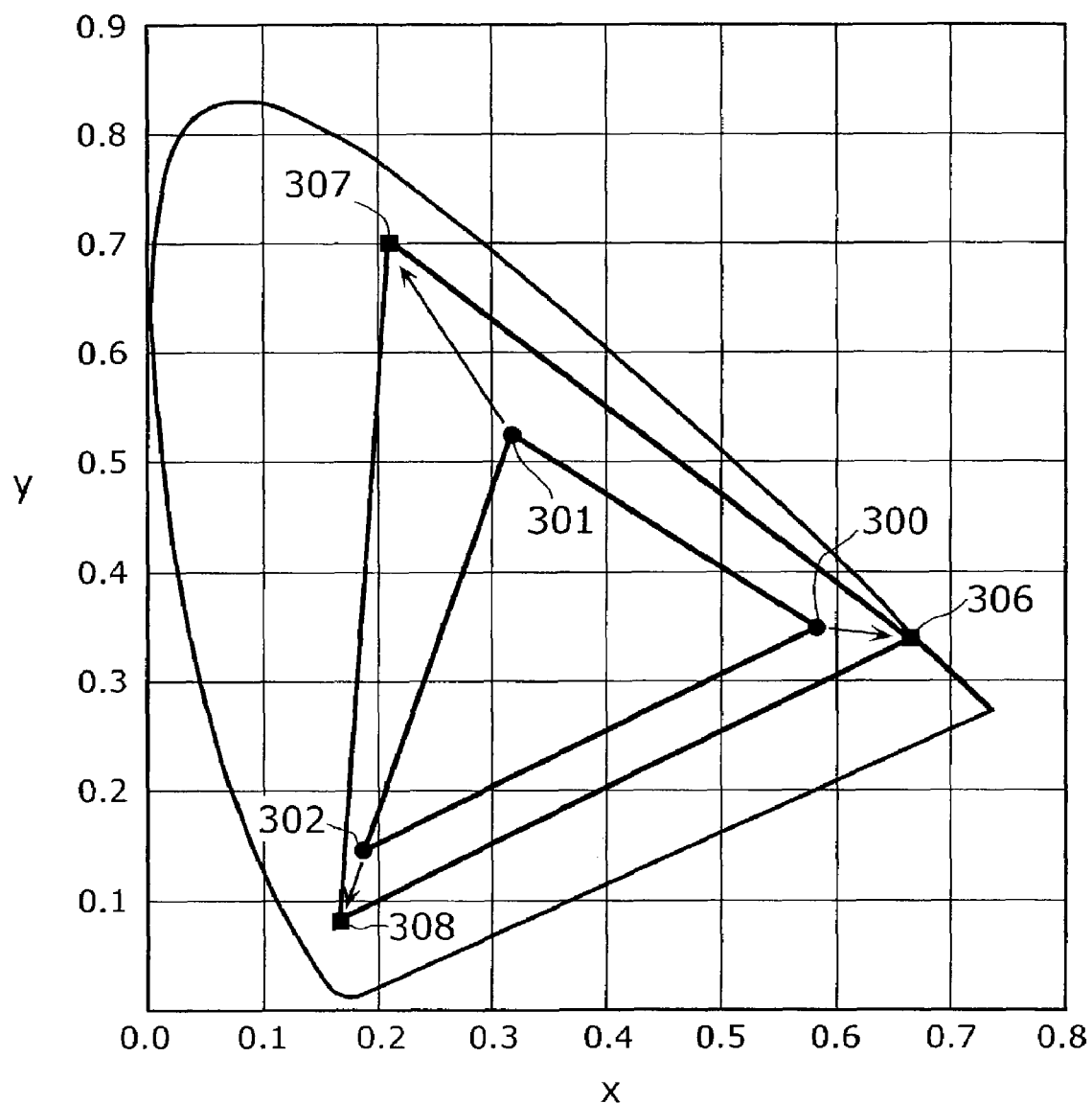
FIG. 9 is a diagram showing an example processing characteristic specified by a color conversion parameter.

FIG. 9 is a diagram showing an example processing characteristic specified by the color conversion parameter.

The point R300, the point G301, and the point B302 on the xy chromaticity diagram form a triangle indicating the color reproducibility of the display device 3 measured by following the aforementioned procedure. Meanwhile, a point R306, a point G307, and a point B308 are chromaticity points indicating the target color reproducibility to be obtained. Note that the chromaticity points R306, G307, and B308 indicating the color reproducibility to be obtained are not necessarily identical with the chromaticity points R303, G304 and B305 indicating the color reproducibility of the NTSC standard illustrated in FIG. 3.

The color conversion processing circuit 51 performs processing for increasing the amplitude of the color signals so as to approximate the point R300 to the point R306, the point G301 to the point G307, and the point B302 to the point B308 respectively in a pseudo manner as indicated by the arrows in the FIG. 9. However, since it does not mean that the color reproducibility of the display device 3 itself is expanded, an image on the display device 3 is displayed with its color being saturated within the triangle formed by the points R300, G301 and B302. Neutral colors, on the other hand, are displayed vividly, and therefore an appropriate setting of color conversion parameters enables color saturation to be minimized and therefore the image to be displayed vividly.

Accordingly, it is necessary to make an appropriate selection of the color chromaticity points R306, G307 and B308 indicating the color reproducibility to be obtained and to display the image which has been actually processed by the color conversion processing circuit 51 on the display device 3 so as to make an adjustment to the target color reproducibility while checking the image quality. The image processing support system according to the present embodiment is well capable of supporting such a requirement.

Processing to be actually performed by the color conversion processing circuit 51 in the present embodiment is a calculation presented as Expression (1). The following describes a parameter calculation method for carrying out a process corresponding to the aforementioned explanation given with reference to FIG. 9.

The input/output signals in Expression (1) are RGB signals, but since FIG. 9 shows an xy chromaticity chart, conversion to be conducted in this respect needs to be taken into consideration. A description is provided here for processing for mapping chromaticity points in the case where the input signals are displayed as they are on the color reproducibility range of the display device 3 over the chromaticity points on the target color reproducibility range. Letting the chromaticity of a certain color in the color reproducibility range of the display device 3 be x, y, and z, tristimulus values X, Y, and Z in the X Y Z system are, $$X=xS, Y=yS, Z=zS \qquad (4).$$

Note, however, that $S=X+Y+Z$

Meanwhile, letting the chromaticity of the corresponding color in the target color reproducibility range be x', y' and z', tristimulus values X', Y', and Z' in the X Y Z system are, $$X'=x'S', Y'=y'S', Z'=z'S' \qquad (5).$$

Note, however, that $S'=X'+Y'+Z'$

The conversion from the XYZ tristimulus values to RGB tristimulus values is conducted using the following expression:

$$\begin{pmatrix} R \\ G \\ B \end{pmatrix} = \begin{pmatrix} 0.4184 & -0.1586 & -0.0828 \\ -0.0912 & 0.2524 & 0.0157 \\ 0.0009 & -0.0026 & 0.1786 \end{pmatrix} \begin{pmatrix} X \\ Y \\ Z \end{pmatrix} \qquad (6)$$

For example, assuming that the xy chromaticity of each of the RGB chromaticity points when the input signals are directly displayed on the color reproducibility range of the display device 3 are R(Rx, Ry, Rz), G(Gx, Gy, Gz) and B(Bx, By, Bz), the following expression (7) resulted from Expressions (1), (4), (5) and (6) is used to determine a color conversion parameter used to adjust them to the xy chromaticity of each of the RGB chromaticity points R'(Rx', Ry', Rz'), G'(Gx', Gy', Gz') and B'(Bx', By', Bz') in the target color reproducibility range:

$$\begin{pmatrix} A11 & A12 & A13 \\ A21 & A22 & A23 \\ A31 & A32 & A33 \end{pmatrix} = \begin{pmatrix} 0.4184 & -0.1586 & -0.0828 \\ -0.0912 & 0.2524 & 0.0157 \\ 0.0009 & -0.0026 & 0.1786 \end{pmatrix} \begin{pmatrix} Rx' & Gx' & Bx' \\ Ry' & Gy' & By' \\ Rz' & Gz' & Bz' \end{pmatrix}$$
$$\left( \begin{pmatrix} 0.4184 & -0.1586 & -0.0828 \\ -0.0912 & 0.2524 & 0.0157 \\ 0.0009 & -0.0026 & 0.1786 \end{pmatrix} \begin{pmatrix} Rx & Gx & Bx \\ Ry & Gy & By \\ Rz & Gz & Bz \end{pmatrix} \right)^{-1} \qquad (7)$$

Using the above Expression (7), the parameter calculating unit 14 determines a color conversion parameter (A11, A12, A13, A21, A22, A23, A31, A32 and A33) used to convert each of the chromaticity points of the display device 3 R(Rx, Ry, Rz), G(Gx, Gy, Gz) and B(Bx, By, Bz) into the chromaticity points R'(Rx', Ry', Rz'), G'(Gx', Gy', Gz') and B'(Bx', By', Bz') adjusted to the target color reproducibility range.

The color conversion parameter calculated by the parameter calculating unit 14 of the image processing support device 1 is outputted to the image processing device 2 by the parameter setting unit 15.

In the image processing device 2, a switching is made to a color conversion parameter intended for a different color reproducibility range on the basis of the result of a detection carried out in the detection circuit 45 as in the case of inverse gamma correction parameters. For instance, when a color conversion parameter in the case where an input image signal complies with NTSC is used as a reference, it is assumed that graphic images generated by software are often displayed when such input image signal is of 8-bit full scale. In this case, since dark-colored images are often used in graphic images, the detection circuit 45 controls the parameter selecting unit 44 to make it select a color conversion parameter with which the color reproducibility range to be obtained is set slightly inward in FIG. 9, that is, with which the color reproducibility range to be obtained is set slightly closer to the color reproducibility range of the display device 3, in order to avoid limiting the color reproducibility of the color reproducibility range of the display device 3 indicated by the triangle formed by the points 300, 301, and 302.

Figure 10:
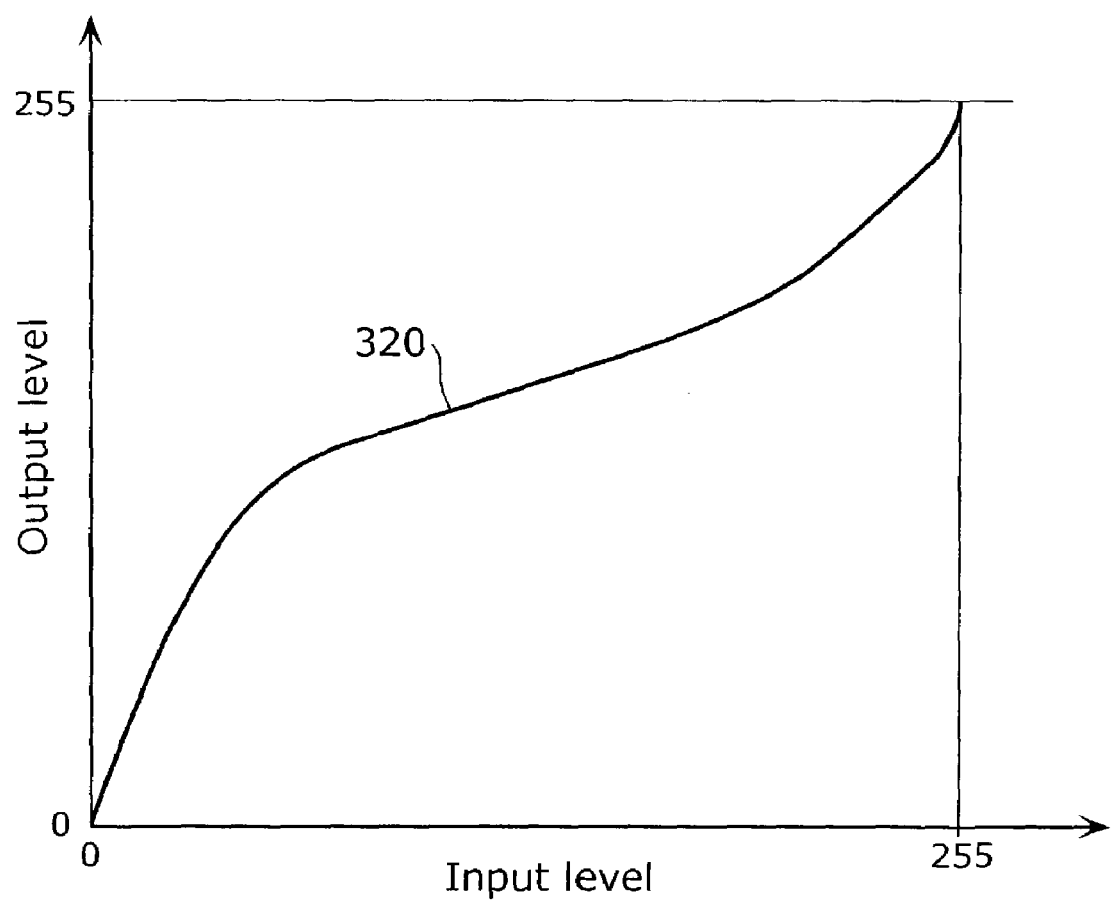
FIG. 10 is a diagram showing an example processing characteristic specified by a gamma correction parameter.

FIG. 10 is a diagram showing an example processing characteristic specified by the gamma correction parameter. This characteristic, which represents the inverse characteristic of the gamma characteristic of the display device 3 illustrated in FIG. 2, can be obtained by allocating "0" to the lowest brightness level and "255" to the highest brightness level on the Y axis shown in FIG. 2, and then exchanging the X axis with the Y axis. Therefore, such characteristic can be determined from measured values only through a calculation.

In the parameter calculation operation described above, it is necessary to check image quality on a display device to be actually used, in order to obtain a visually satisfactory image through brightness and color control. An operator can compare the variations in the parameters and image quality to be actually displayed on the display device 3 by the parameter calculating unit 14 in FIG. 1 displaying, for the operator, parameter calculation information (e.g., measured values and target values used for parameter calculations as well as calculation results, values to be obtained in the middle of the calculations) on the operation screen display device 5, via the image signal outputting unit 17, and further transferring the calculated parameters to the image processing device 2 so as to output to the display device 3 an actually processed image signal.

Figure 11:
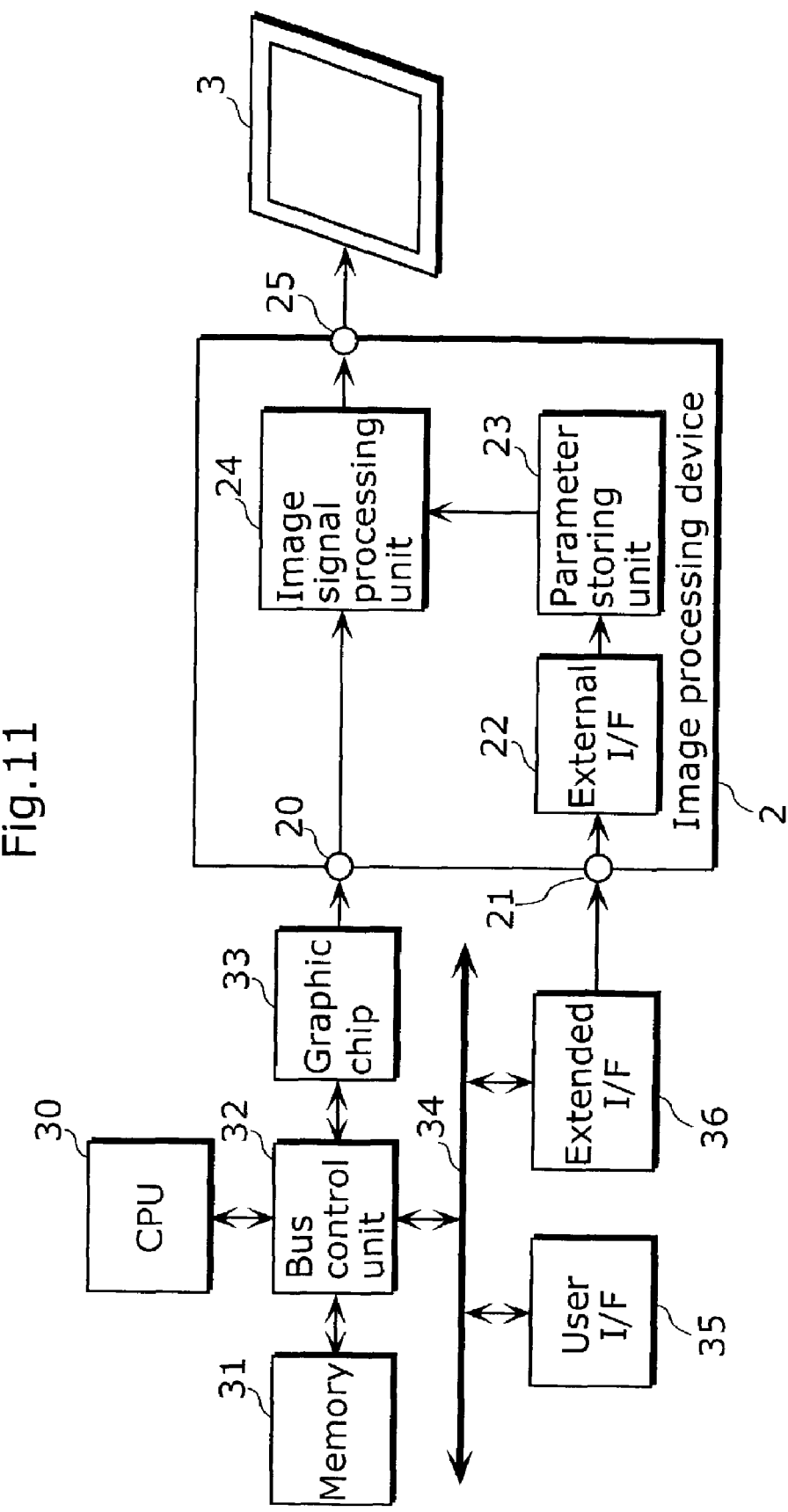
FIG. 11 is a block diagram showing a configuration of a notebook PC which incorporates the image processing device and the display device.

The image processing device 2 for which the parameters are set in the aforementioned manner is embedded into an apparatus used in combination with the display device 3, and produced in quantity. FIG. 11 is a block diagram showing the configuration of a notebook PC which is an example of such apparatus. In FIG. 11, the same numbers are assigned to the same components as those illustrated in FIG. 1, and detailed explanations therefore are omitted.

The notebook PC is comprised of the image processing device 2, the display device 3, a CPU 30, a memory 31, a bus control unit 32, a graphic chip 33, a bus 34, a user interface 35, and an extended interface 36. Note that the above configuration is equivalent to that of a general personal computer, excluding that the image processing device 2 is included.

Graphics generated in the CPU 30 through calculations as well as still/moving images acquired, via various kinds of drives and networks (not illustrated in the diagram) connected to the extended interface 36, are outputted to the image processing device 2 via the graphic chip 33. Since the parameter storing unit 23 of the image processing device 2 holds the image processing parameters in the EEPROM 40 and performs processing using parameters which have been appropriately set for the display device 3, it is possible to display, on the display device 3, a satisfactory image for which brightness and color control has been performed to suit a specific characteristic of the display device 3.

It is also possible to change the contents of image processing by controlling the parameter storing unit 23, via the extended interface 36 and the external interface 22, by the use of control software to be executed on the CPU 30. In this case, an SM bus, a USB and the like, for example, may be used as the external interface 22 of the image processing device 2. The contents of image processing to be changed by the control software include the change of processing parameters in the inverse gamma process mentioned above, that is to say, the selection of a gamma coefficient, the use/non-use of linear characteristic or the like in the case where an input image signal is not compliant with NTSC. An instruction for making such changes is given to the image processing device 2 via the control software by application software responsible for image display which makes a necessary judgment from the file name of an image file and data appended to image data. Furthermore, when an image signal includes many dark scenes as in the case of a movie and the like, it is also possible that application software responsible for image display makes a judgment on this according to appended data to image data to be reproduced as well as to an operation of the user of the notebook PC illustrated in FIG. 11, and gives an instruction to the image processing device 2 via the control software to perform image processing for displaying dark parts of the scenes brightly. Moreover, it is also possible to change these processes appropriately for each of screen areas divided on the display device (what is known as windows). The following explains the necessary configuration for this.

Figure 12:
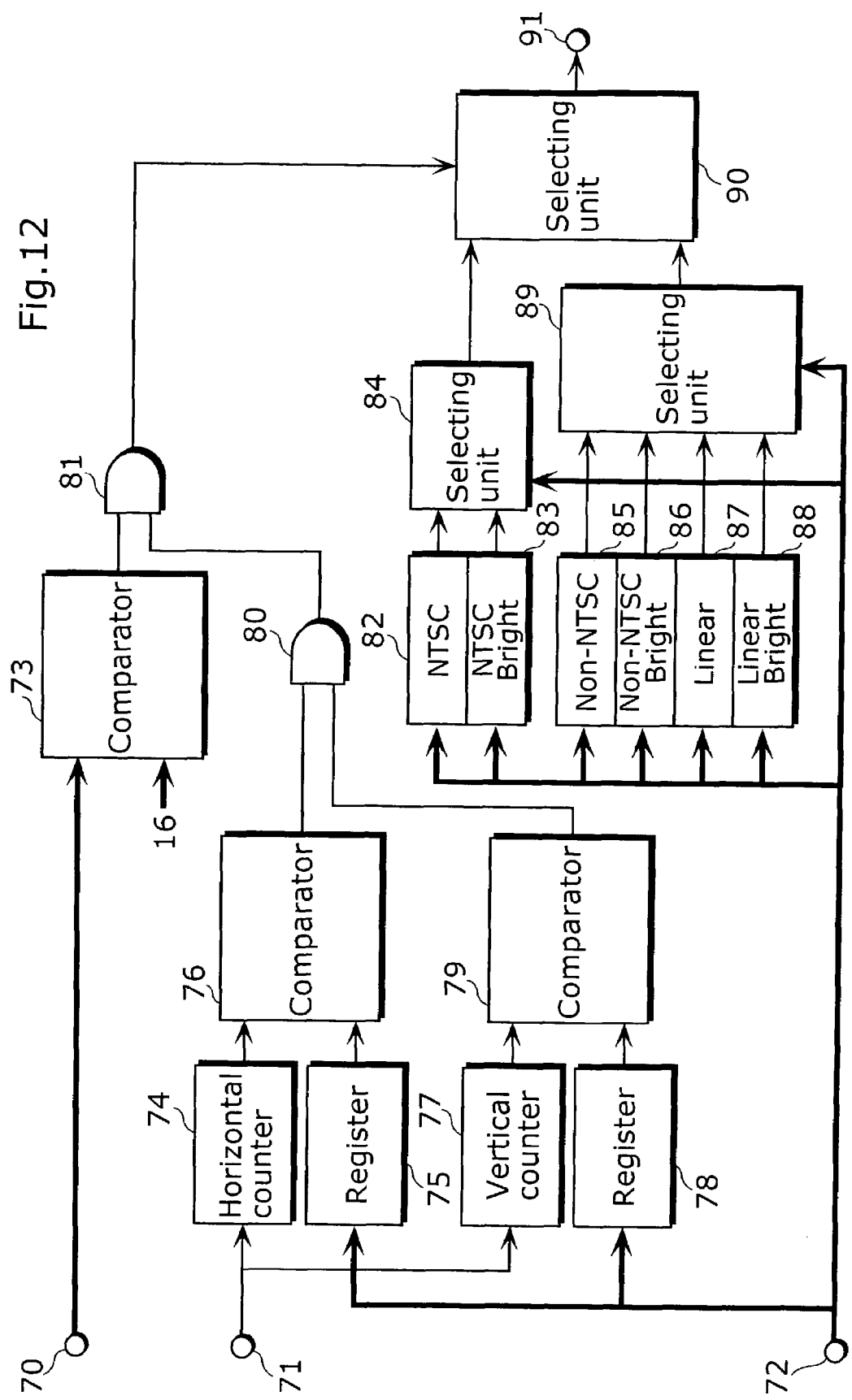
FIG. 12 is a block diagram showing a configuration of a detection circuit of a parameter storing unit.

FIG. 12 is a block diagram showing the configuration of the detection circuit 45 of the parameter storing unit 23.

The detection circuit 45 has input terminals 70, 71, and 72, a comparator 73, a horizontal counter 74, a register 75, a comparator 76, a vertical counter 77, a register 78, a comparator 79, AND gates 80 and 81, registers 82 and 83, a selecting unit 84, registers 85, 86, 87, and 88, selecting units 89 and 90, and an output terminal 91.

The input terminal 72 receives an instruction from the CPU 30, via the extended interface 36 and the external interface 22, and notifies the instruction to the registers 75, 78, 82, 83, 85, 86, 87, and 88, and to the selecting units 84 and 89. The application software executed on the CPU 30 is responsible for the settings of these registers and selecting units, but descriptions about how such application software is configured and how it reproduces an image signal are omitted since it does not directly concerned with the operations to be performed according to the present embodiment, and an explanation is given below for the contents of the settings that the application software makes for each unit of the detection circuit 45.

Top addresses of the areas in the EEPROM 40 where each image processing parameter is stored are set to the registers 82, 83, 85, 86, 87 and 88. Note that although such EEPROM addresses can be set from the CPU 30 in the present embodiment, the same effect can be achieved if such addresses are substituted by completely fixed addresses.

An EEPROM address indicating an image processing parameter used for processing an NTSC-compliant image is set to the register 82. An EEPROM address indicating an image processing parameter used for brightly displaying an image which is NTSC-compliant and which includes many dark scenes as in the case of a movie and the like is set to the register 83. Similarly, an EEPROM address indicating an image processing parameter used for processing an image which does not comply with NTSC is set to the register 85. An EEPROM address indicating an image processing parameter used for brightly displaying an image which is not NTSC-compliant and which includes many dark scenes as in the case of a movie and the like is set to the register 86. Furthermore, an EEPROM address indicating an image processing parameter used for processing an image with a linear characteristic for which a display gamma process has not been performed is set to the register 87. An EEPROM address indicating an image processing parameter used for brightly displaying an image with a linear characteristic for which a display gamma process has not been performed and which includes many dark scenes as in the case of a movie and the like is set to the register 88.

The selecting unit 84 makes a selection as to which image processing parameters, the image processing parameter for displaying an image brightly or an ordinary image processing parameter, is used for processing an NTSC-compliant image. Then, the selecting unit 84 outputs the EEPROM address of the selected image processing parameter to the selecting unit 90 as an NTSC-compliant image processing parameter. The setting concerning the selection of one of the above image processing parameters made by the selecting unit 84 is carried out by the application software on the CPU 30 via the input terminal 72. The application software may make such a judgment by presenting the user, through a GUI, which one of the image processing parameters is used so as to ask such user to make a selection, or by determining in advance to add appended data to an image signal so that the application software will analyze such appended data and automatically selects one of the above image processing parameters.

Also, the selecting unit 89 selects one image processing parameter for processing a non-NTSC compliant image which supports the following four types of image signals: (1) an image signal which is not NTSC-compliant, but for which a display gamma correction process has been performed; (2) a non-NTSC compliant image signal for which a display gamma correction process has been performed and which requires brightness enhancement; (3) an image signal for which a display gamma correction process has not been performed; and (4) an image signal for which a display gamma correction process has not been performed and which requires brightness enhancement. Subsequently, the selecting unit 89 outputs the EEPROM address of the selected image processing parameter to the selecting unit 90 as a non-NTSC compliant image processing parameter. Which one of the above image processing parameters is to be selected by the selecting unit 89 is set, via the input terminal 72, by the application software on the CPU 30, as in the case of the selecting unit 84.

Figure 13:
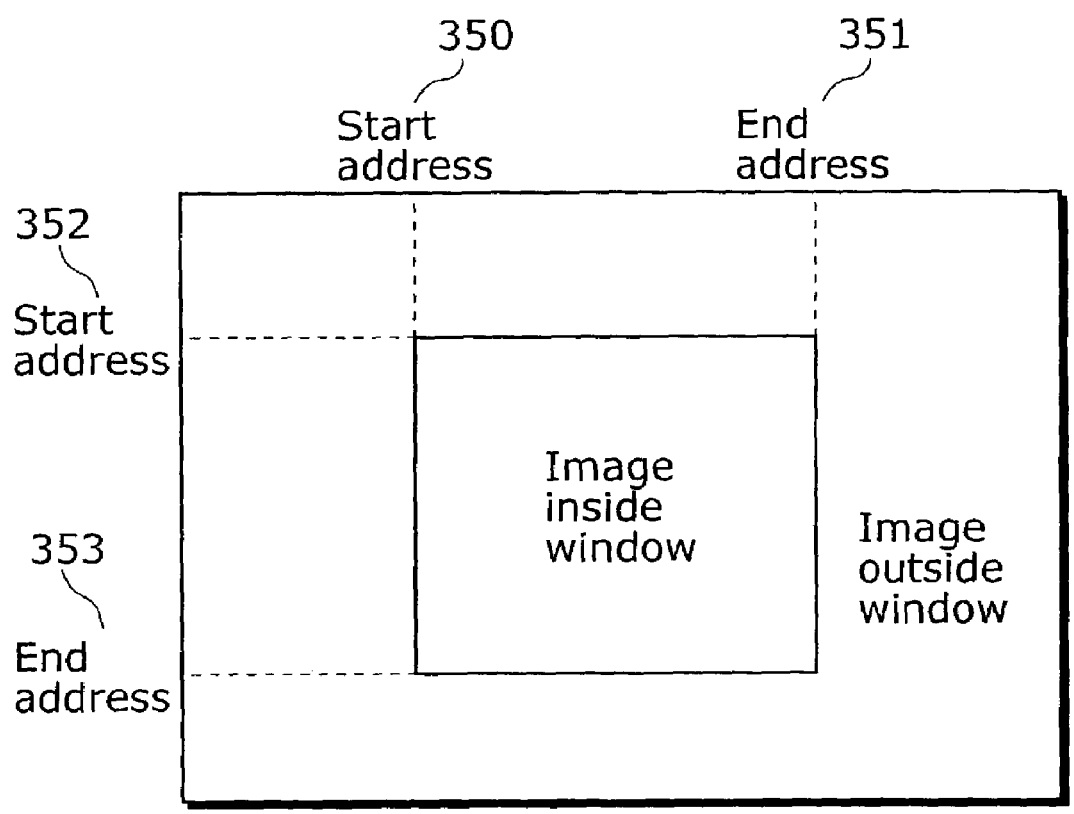
FIG. 13 is a conceptual diagram showing a display screen handled by the image processing device.

Next, an explanation is given for the selection between the NTSC-compliant image processing parameter and the non-NTSC compliant image processing parameter. FIG. 13 is a conceptual diagram showing a display screen to be handled by the image processing device 2. In the present embodiment, the application software running on the CPU 30 sets one area (window) on the whole display screen, and a non-NTSC compliant image is always displayed as an image outside the window. As for an image inside the window, there are two cases where an NTSC-compliant image is displayed and a non-NTSC compliant image is displayed.

A horizontal start address 350 and a horizontal end address 351 are set in the register 75. In the register 78, a vertical start address 352 and a vertical end address 353 are set. Meanwhile, a synchronous signal is inputted from the input terminal 71. The horizontal counter 74 and the vertical counter 77 are reset by such synchronous signal so as to count horizontal and vertical addresses on the display screen, respectively.

The comparator 76 compares a horizontal address value outputted by the horizontal counter 74 with the horizontal start address 350 and the horizontal end address 351 set in the register 75, and outputs to the AND gate 80 a "Hi" signal, when such horizontal address indicates an area corresponding to the image inside the window. Furthermore, the comparator 79 compares a vertical address value outputted by the vertical counter 77 with the vertical start address 352 and the vertical end address 353 set in the register 78, and outputs to the AND gate 80 a "Hi" signal, when such horizontal address indicates an area corresponding to the image inside the window. Accordingly, the AND gate 80 outputs to the AND gate 81 a "Hi" signal only at the timing when the image inside the window is indicated.

Meanwhile, an image signal is inputted from the input terminal 70. The comparator 73 judges whether the image signal inputted, via the input terminal 70, includes any data value whose input level is less than 16, and outputs to the AND gate 81 a "Hi" signal when there exists no data value less than 16. Accordingly, as an output of the AND gate 81, a "Hi" signal is outputted to the selecting unit 90 when the image inside the window does not include any data value less than 16 (when judged to be an NTSC-compliant image signal).

Following the above operation, the selecting unit 90 outputs, to the output terminal 91, the EEPROM address indicating the NTSC-compliant image processing parameter inputted from the selecting unit 84, when a signal sent from the AND gate 81 is "Hi", judging that the image inside the window is an NTSC-compliant image signal. When a signal from the AND gate 81 is "Lo", on the other hand, the selecting unit 90 outputs to the output terminal 91, the EEPROM address indicating the non-NTSC compliant image processing parameter inputted from the selecting unit 84, judging that the image inside the window is a non-NTSC compliant image signal, or that it is a timing at which the image outside the window is displayed. The parameter selecting unit 44 reads out, from the EEPROM 40, the image processing parameters which are stored in EEPROM addresses and which have been sent via the output terminal 91, and sets them in the registers 41, 42, and 43 respectively.

Note that "the image outside the window" here refers to an image representing the background of the window, in which a graphic image provided by an OS is generally displayed on a notebook PC. For this reason, by using an image processing parameter for an image signal not in compliance with NTSC as a fixed image processing parameter for the background image of the window, it is possible to realize a circuit configuration which does not include a unit responsible for selecting an image processing parameter for the background image as in the case of the circuit configuration shown in FIG. 12, contributing to the reduction in the scale of circuits as well as in the amount of power consumption.

Next, an explanation is given for each gamma correction parameter selected by the detection circuit 45 illustrated in FIG. 12 concerning its example characteristic and a preparation method.

Figure 14:
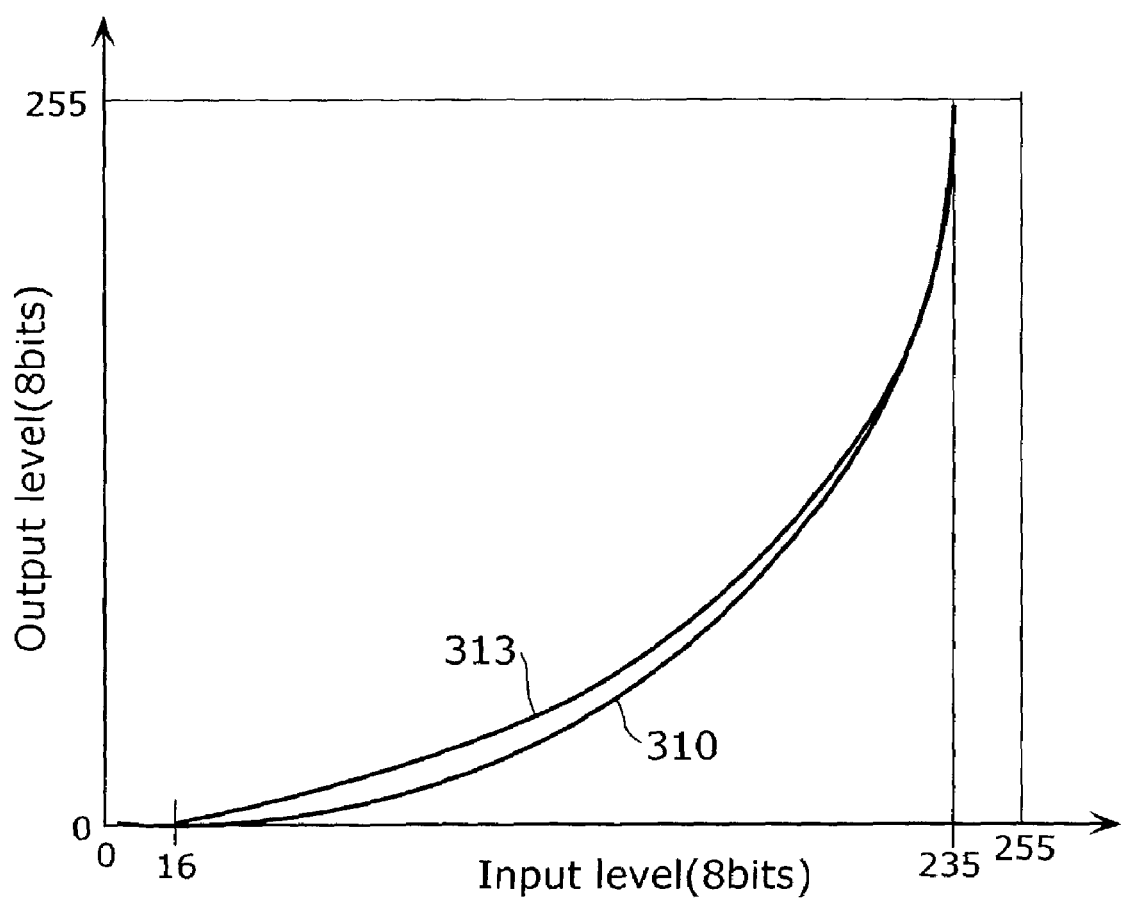
FIG. 14 is a diagram showing a characteristic of an inverse gamma correction parameter in an NTSC-compliant image processing parameter.

FIG. 14 is a diagram showing the characteristic of the inverse gamma correction parameter in an image processing parameter for an NTSC-compliant image signal. The curve 310 indicates a gamma curve, when y=2.2, in conformity with the NTSC standard. In contrast, when brightness needs to be enhanced, a curve indicates a slightly higher output level with respect to the gamma curve when a curve 313=2.2, when an input level in particular is low, as represented by a curve 313. Such a curve is prepared using the following Expression (8) ("**" indicates an exponential operation):

When Xg<16, $Yg=0$

When $16 \leqq Xg < 2 \times B$, $$Yg = 255 \times ((Xg - 16)/(235 - 16) ** (1/2.2)) + A \times (1 - \cos(\pi((Xg - 16)/B)))$$

When $2 \times B \leqq Xg \leqq 235$, $Yg = 255 \times ((Xg-16)/(235-16)**(1/2.2))$ When $235 < Xg$, $Yg=255$         (8)

Using Expression (8), an inverse gamma correction parameter resulted from enhancing only the maximum level A of the original inverse gamma correction characteristic, with (Xg−16)=B as the peak.

Another way to obtain a curve indicating enhanced brightness with respect to the curve 310 indicating the original inverse gamma characteristic is to make the gamma coefficient slightly smaller than 2.2 (e.g., 2.0) in the original Expression (2).

Figure 15:
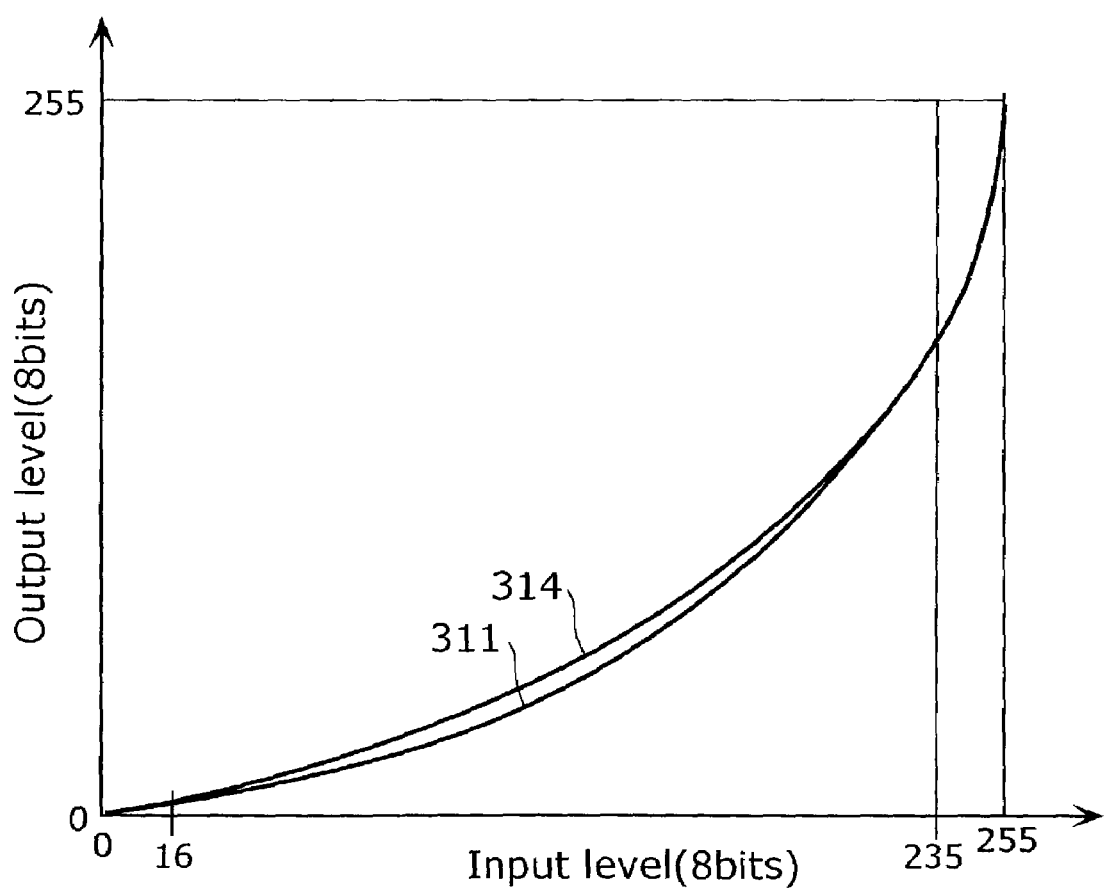
FIG. 15 is a diagram showing a characteristic of an inverse gamma correction parameter in a non-NTSC compliant image processing parameter.

FIG. 15 is a diagram showing an example characteristic of the inverse gamma correction parameter in an image processing parameter for a non-NTSC compliant image signal. The curve 311 indicates a gamma curve when y=2.2, in the case where an 8-bit parallel full scale is employed for input. In contrast, when brightness needs to be enhanced, such a curve indicates a slightly higher output level with respect to the gamma curve when y=2.2, as represented by a curve 314. Such a curve is prepared using the following Expression (9) ("**" indicates an exponential operation):

When $Xg < 2 \times B$, $$Yg = 255 \times (Xg/255) ** (1/2.2) + A \times (1 - \cos(\pi(Xg/B)))$$

When $Xg \geqq 2 \times B$, $Yg = 255 \times (Xg/255) ** (1/2.2)$         (9)

Using Expression (9), an inverse gamma correction parameter resulted from enhancing only the maximum level A of the original inverse gamma correction characteristic, with Xg=B as the peak.

Another way to obtain a curve indicating enhanced brightness with respect to the curve 311 indicating the original inverse gamma characteristic is to make the gamma coefficient slightly smaller than 2.2 in the original Expression (3).

Figure 16:
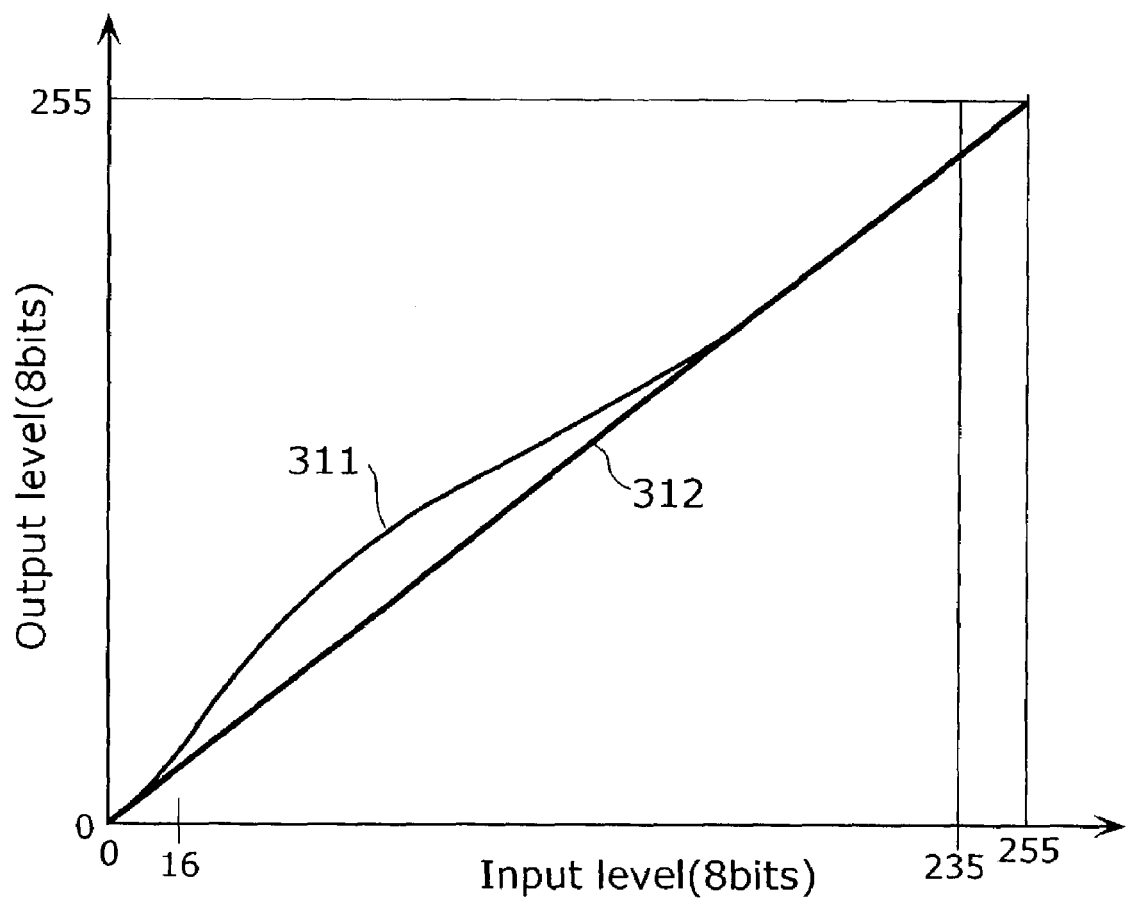
FIG. 16 is a diagram showing a characteristic of an inverse gamma correction parameter supporting an image signal for which a display gamma correction process has not been performed.

FIG. 16 is a diagram showing an example characteristic of the inverse gamma correction parameter supporting an image signal for which a display gamma correction process has not been performed. The line 312 shows that input and output in the inverse gamma correction circuit 50 have a completely linear characteristic. In contrast, when brightness needs to be enhanced, such a curve as indicates a slightly higher output level with respect to such linear characteristic, as represented by a curve 315. Such a curve is prepared using the following Expression (10):

When Xg<2×B, $$Yg = Xg + A \times (1 - \cos(\pi(Xg/B)))$$

When Xg≧2×B, $$Yg = Xg \qquad (10)$$

Using Expression (10), an inverse gamma correction parameter resulted from enhancing only the maximum level A of the original inverse gamma correction characteristic, with Xg=B as the peak.

As explained above, inverse gamma correction parameters having the characteristics illustrated in FIGS. 14, 15 and 16 can be easily prepared. By the parameter calculating unit 14 preparing an inverse gamma correction parameter through calculation using Expressions (8), (9), or (10), it is possible to prepare an optimal image processing parameter for a specific display device for brightly displaying an image signal when such image signal includes many dark scenes as in the case of a movie and the like.

As described above, according to the present embodiment, it is possible to incorporate the image processing device into portable display devices including notebook PCs by employing not a DSP but a small-scale dedicated hardware even in terms of power consumption and the scale of circuits to be mounted, as well as to vividly display, with a simple configuration, image signals which are the mixture of an image signal compliant with such a standard as NTSC and an image signal which does not comply with any standards. Furthermore, even when more than one kind of display devices are used as a display device, the present invention allows such display devices to be performed of optimal brightness/color correction and enhancement as well as allowing volume production of display apparatuses which incorporate such a display device and an image processing device as a set.

Also, unlike the case where individual end users conduct color management, the present invention allows apparatus manufacturers to supply in quantity image display apparatuses capable of providing visually superior images, utilizing their accumulated expertise about display devices.

Note that although the comparator 73 is described in the present embodiment as simply comparing image signal data with the value "16", the comparator 73 may also be configured to include an integrating unit and select a non-NTSC compliant parameter only when there are more than a certain number of values less than 16.

Furthermore, instead of selecting EEPROM addresses in the detection circuit 45, it is possible that all image processing parameters are read first from the EEPROM out to the registers 82, 83, 85, 86, 87, and 88 when the power is turned on, for example, so that image processing parameters themselves are selected and set directly to the registers 41, 42, and 43 via the output terminal 91.

Moreover, although only one window is used in the explanation of FIG. 13, the present embodiment is capable of being extended to handle the case where a specific image processing parameter is used for each of a plurality of windows.

Also, although explanations are given for image signals which do/do not comply with NTSC, NTSC is only an example standard, and therefore images in compliance with such a standard as HDTV are also in the scope of application.

Furthermore, although explanations are given for the case where input signals of the display device 3 are 8-bit parallel RGB digital signals, the present invention is not limited to such signals, and image signals in general are also in the scope of application. Also note that the display device 3 is not limited to the liquid crystal display of a notebook PC, and therefore that the same effect can be achieved by using a general display device such as a CRT and a PDP.

Moreover, although an explanation is given for the case where 3×3 matrix calculation is employed as a color conversion process, the present invention is not limited to this, and therefore another color conversion process is also in the scope of application.

As explained above, according to the image processing device of the present invention, since parameters are selected according to an inputted image signal and signal processing is performed for the image signal on the basis of such parameters, it is possible to perform optimal signal processing for the image signal and to vividly display the processed image signal on the display device. It is also possible for the image processing device, according to the present invention, to be incorporated into a portable display apparatus such as a notebook PC in terms of power consumption and the scale of circuits to be mounted, as well as to vividly display image signals which are the mixture of an image signal compliant with a standard such as NTSC and an image signal which does not comply with any standards. Furthermore, even when more than one kind of a display device is used as a display device, the present invention allows the display devices to perform optimal brightness/color correction and enhancement as well as allowing volume production of display apparatuses which incorporate the display device and an image processing device as a set.

What is claimed is:

1. An image processing device for performing signal processing on an inputted image signal based on parameters, the image processing device comprising:
   a parameter storing unit operable to store a plurality of parameters;
   a parameter selecting unit operable to select one of the plurality of parameters according to the input image signal;
   an image signal processing unit operable to perform the signal processing on the input image signal based on the parameter selected by the parameter selecting unit; and
   a dividing unit operable to divide a portion of the input image signal into a background screen and a portion of the input image signal into at least one window area, the dividing depending on where on a display screen the input image signal is displayed,
   wherein the parameter selecting unit selects a specified parameter, from among the plurality of parameters, for the portion of the input signal divided into the background screen, and selects one parameter, from among the plurality of the parameters, for the portion of the input signal divided into the at least one window area on a window area basis according to the input image signal, and
   wherein the image signal processing unit performs the signal processing for the background screen and the at least one window area on a window area basis, based on the parameters selected by the parameter selecting unit.

2. The image processing device according to claim 1, wherein the parameter selecting unit makes a judgment of whether the input image signal includes a signal at a signal level that is less than a first specified value or a signal at a signal level that is over a second specified value, and selects the parameters based on a result of the judgment.

3. The image processing device according to claim 1, wherein the parameter storing unit stores a plurality of inverse gamma correction parameters, wherein the parameter selecting unit selects one of the plurality of inverse gamma correction parameters, and wherein the image signal processing unit includes an inverse gamma correcting unit operable to perform an inverse gamma correction process on the input image signal based on the inverse gamma correction parameter selected by the parameter selecting unit.

4. The image processing device according to claim 2, wherein the parameter storing unit stores a plurality of inverse gamma correction parameters, wherein the parameter selecting unit selects one of the plurality of inverse gamma correction parameters, and wherein the image signal processing unit includes an inverse gamma correcting unit operable to perform an inverse gamma correction process on the input image signal based on the inverse gamma correction parameter selected by the parameter selecting unit.

5. The image processing device according to claim 1, wherein the parameter storing unit stores a plurality of color conversion parameters, wherein the parameter selecting unit selects one of the plurality of color conversion parameters, and wherein the image signal processing unit includes a color converting unit operable to perform a color conversion process on the input image signal based on the color conversion parameter selected by the parameter selecting unit.

6. The image processing device according to claim 2, wherein the parameter storing unit stores a plurality of color conversion parameters, wherein the parameter selecting unit selects one of the plurality of color conversion parameters, and wherein the image signal processing unit includes a color converting unit operable to perform a color conversion process on the input image signal based on the color conversion parameter selected by the parameter selecting unit.

7. The image processing device according to claim 1, wherein the parameter storing unit stores a plurality of color conversion parameters, wherein the parameter selecting unit selects one of the plurality of color conversion parameters, and wherein the image signal processing unit includes:

an inverse gamma correcting unit operable to perform an inverse gamma correction process on the input image signal; and a color converting unit operable to perform a color conversion process on a signal output from the inverse gamma correcting unit based on the color conversion parameter selected by the parameter selecting unit.

8. The image processing device according to claim 2, wherein the parameter storing unit stores a plurality of color conversion parameters, wherein the parameter selecting unit selects one of the plurality of color conversion parameters, and wherein the image signal processing unit includes:

an inverse gamma correcting unit operable to perform an inverse gamma correction process on the input image signal; and a color converting unit operable to perform a color conversion process on a signal output from the inverse gamma correcting unit based on the color conversion parameter selected by the parameter selecting unit.

9. An image processing device for performing signal processing on an input image signal based on parameters, the image processing device comprising:

a parameter storing unit operable to store a plurality of parameters prior to input of the input image signal;

a parameter selecting unit operable to select one of the plurality of parameters according to a signal level of the input image signal only; and an image signal processing unit operable to perform the signal processing on the input image signal based on the parameter selected by the parameter selecting unit, wherein the parameter selecting unit makes a judgment of whether the input image signal includes a signal at a signal level that is less than a first specified value or a signal at a signal level that is over a second specified value, and selects the parameter based on a result of the judgment, the first specified value being 16 or less and the second specified value being 235 or more, when the input image signal is expressed in 8 bits.

10. An image processing device for performing signal processing on an inputted image signal based on parameters, the image processing device comprising:

a parameter storing unit operable to store a plurality of parameters;

a parameter selecting unit operable to select one of the plurality of parameters according to the input image signal; and an image signal processing unit operable to perform the signal processing on the input image signal based on the parameter selected by the parameter selecting unit, wherein the parameter storing unit stores a plurality of inverse gamma correction parameters, wherein the parameter selecting unit selects one of the plurality of inverse gamma correction parameters, wherein the image signal processing unit includes an inverse gamma correcting unit operable to perform an inverse gamma correction process on the input image signal based on the inverse gamma correction parameter selected by the parameter selecting unit, wherein the plurality of inverse gamma correction parameters includes an inverse gamma correction parameter that realizes a linear input/output characteristic and an inverse gamma correction parameter that realizes an inverse input/output characteristic of a characteristic of a receiver's gamma correction performed on the image signal at a signal generation stage, and wherein the parameter selecting unit makes a judgment of whether the input image signal includes a signal at a signal level that is less than a first specified value or a signal at a signal level that is over a second specified value, and selects the inverse gamma correction parameter that realizes the linear input/output characteristic when the input image signal includes the signal at the signal level that is less than the first specified value or includes the signal at the signal level that is over the second specified value and selects the inverse gamma correction parameter that realizes the inverse input/output characteristic of the characteristic of the receiver's gamma correction performed on the image signal at the signal generation stage when the input image signal does not include the signal at the signal level that is less than the first specified value or include the signal at the signal level that is over the second specified value.

11. An image processing device for performing signal processing on an inputted image signal based on parameters, the image processing device comprising:

a parameter storing unit operable to store a plurality of parameters;

a parameter selecting unit operable to select one of the plurality of parameters according to the input image signal; and an image signal processing unit operable to perform the signal processing on the input image signal based on the parameter selected by the parameter selecting unit, wherein the parameter storing unit stores a plurality of inverse gamma correction parameters, wherein the parameter selecting unit selects one of the plurality of inverse gamma correction parameters, wherein the image signal processing unit includes an inverse gamma correcting unit operable to perform an inverse gamma correction process on the input image signal based on the inverse gamma correction parameter selected by the parameter selecting unit, wherein the plurality of inverse gamma correction parameters includes an inverse gamma correction parameter that realizes an input/output characteristic in which only a part of an output is enhanced with respect to a linear characteristic and an inverse gamma correction parameter that realizes an input/output characteristic in which only a part of an output is enhanced with respect to an inverse characteristic of a characteristic of a receiver's gamma correction performed on the image signal at a signal generation stage, and wherein the parameter selecting unit makes a judgment of whether the input image signal includes a signal at a signal level that is less than a first specified value or a signal at a signal level that is over a second specified value, and selects the inverse gamma correction parameter that realizes the input/output characteristic in which only a part of the output is enhanced with respect to the linear characteristic when the input image signal includes the signal at the signal level that is less than the first specified value or includes the signal at the signal level that is over the second specified value and selects the inverse gamma correction parameter that realizes the input/output characteristic in which only a part of the output is enhanced with respect to the inverse characteristic of the characteristic of the receiver's gamma correction performed on the image signal at the signal generation stage when the input image signal does not include the signal at the signal level that is less than the first specified value or include the signal at the signal level that is over the second specified value.

12. An image processing method for performing signal processing on an inputted image signal based on parameters, the image processing method comprising:

storing a plurality of parameters;

selecting, according to the input image signal, one of the plurality of stored parameters;

performing the signal processing on the input image signal based on the parameter selected in the selecting; and dividing a portion of the input image signal into a background screen and a portion of the input image signal into at least one window area, the dividing depending on where on a display screen the input image is displayed, wherein the selecting includes selecting a specified parameter, from among the plurality of parameters, for the portion of the input signal divided into the background screen and includes selecting one parameter, from among the plurality of parameters, for the portion of the input signal divided into the at least one window area on a window area basis according to the input image signal, and wherein the performing of the signal processing performs the signal processing for the background screen and the at least one window area on a window area basis, based on the parameters selected by the selecting.

13. A computer-readable recording medium having a program recorded thereon, the program for performing signal processing on an inputted image signal based on parameters, and the program causing a computer execute a method comprising:

storing a plurality of parameters;

selecting, according to the input image signal, one of the plurality of stored parameters;

performing the signal processing on the input image signal based on the parameter selected in the selecting; and dividing a portion of the input image signal into a background screen and a portion of the input image signal into at least one window area, the dividing depending on where on a display screen the input image is displayed, wherein the selecting includes selecting a specified parameter, from among the plurality of parameters, for the portion of the input signal divided into the background screen and includes selecting one parameter, from among the plurality of parameters, for the portion of the input signal divided into the at least one window area on a window area basis according to the input image signal, and wherein the performing of the signal processing performs the signal processing for the background screen and the at least one window area on a window area basis, based on the parameters selected by the selecting.

* * * * *